(12) United States Patent
Smith et al.

(10) Patent No.: US 10,732,253 B2
(45) Date of Patent: Aug. 4, 2020

(54) ANTENNA ARRANGEMENTS FOR MEASUREMENT OF ANGLE OF ARRIVAL

(71) Applicant: SR Technologies, Inc., Davie, FL (US)

(72) Inventors: Graham K. Smith, Boca Raton, FL (US); Mark Passler, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 254 days.

(21) Appl. No.: 16/055,605

(22) Filed: Aug. 6, 2018

(65) Prior Publication Data

US 2019/0056472 A1 Feb. 21, 2019

Related U.S. Application Data

(60) Provisional application No. 62/548,102, filed on Aug. 21, 2017.

(51) Int. Cl.
| | |
|---|---|
| *G01S 3/48* | (2006.01) |
| *H01Q 21/06* | (2006.01) |
| *H04B 7/08* | (2006.01) |
| *G01S 3/46* | (2006.01) |
| *H04W 64/00* | (2009.01) |
| *G01S 5/14* | (2006.01) |
| *G01S 3/04* | (2006.01) |
| *G01S 13/87* | (2006.01) |

(52) U.S. Cl.
CPC ............. *G01S 3/48* (2013.01); *G01S 3/46* (2013.01); *H01Q 21/065* (2013.01); *H04B 7/086* (2013.01); *G01S 3/043* (2013.01); *G01S 5/14* (2013.01); *G01S 13/878* (2013.01); *H04W 64/006* (2013.01)

(58) Field of Classification Search
CPC . G01S 3/48; G01S 3/46; G01S 13/878; G01S 5/14; G01S 3/043; G01S 5/02; H04W 64/00; H04W 64/006; H01Q 1/246; H01Q 21/065; H04B 7/086
See application file for complete search history.

(56) References Cited

U.S. PATENT DOCUMENTS

| | | | | |
|---|---|---|---|---|
| 5,572,220 A | * | 11/1996 | Cai | G01S 3/043 342/424 |
| 2002/0027526 A1 | * | 3/2002 | Kohno | G01S 3/46 342/418 |
| 2008/0316105 A1 | * | 12/2008 | Seong | G01S 5/12 342/442 |
| 2013/0023278 A1 | * | 1/2013 | Chin | G01S 5/0205 455/456.1 |
| 2013/0271323 A1 | * | 10/2013 | Joo | G01S 3/48 342/442 |

(Continued)

*Primary Examiner* — Olumide Ajibade Akonai
(74) *Attorney, Agent, or Firm* — Christopher & Weisberg, P.A.

(57) ABSTRACT

A method and receiver for determination of angle of arrival in one or two planes of a beam received at an antenna array comprising at least two pairs of antenna elements are provided. In some embodiments, a method includes computing a pair of difference signals, each difference signal being computed from signals from a different one of the at least two pairs of antenna elements. The method further includes determining a directional angle of arrival of the beam in one plane based on the pair of difference signals.

20 Claims, 18 Drawing Sheets

(56) References Cited

U.S. PATENT DOCUMENTS

2014/0347212 A1* 11/2014 Tuxen ................. G01S 13/4454
                                                        342/147
2017/0059685 A1*  3/2017 Moghaddasi ............ H01Q 3/30
2018/0267131 A1*  9/2018 Simileysky ........... H04W 4/026
2018/0306888 A1* 10/2018 Robinson .................. G01S 3/46

* cited by examiner

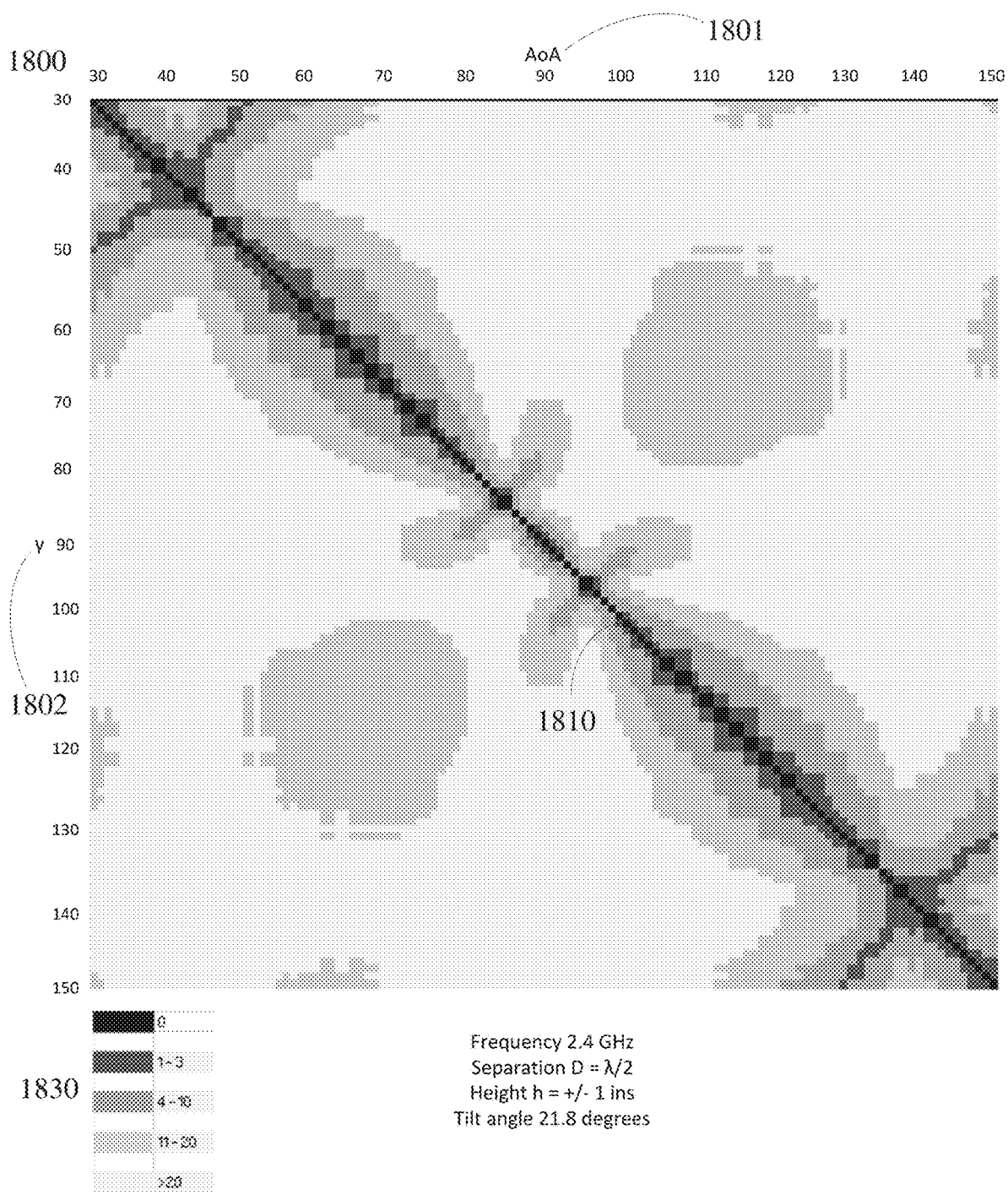

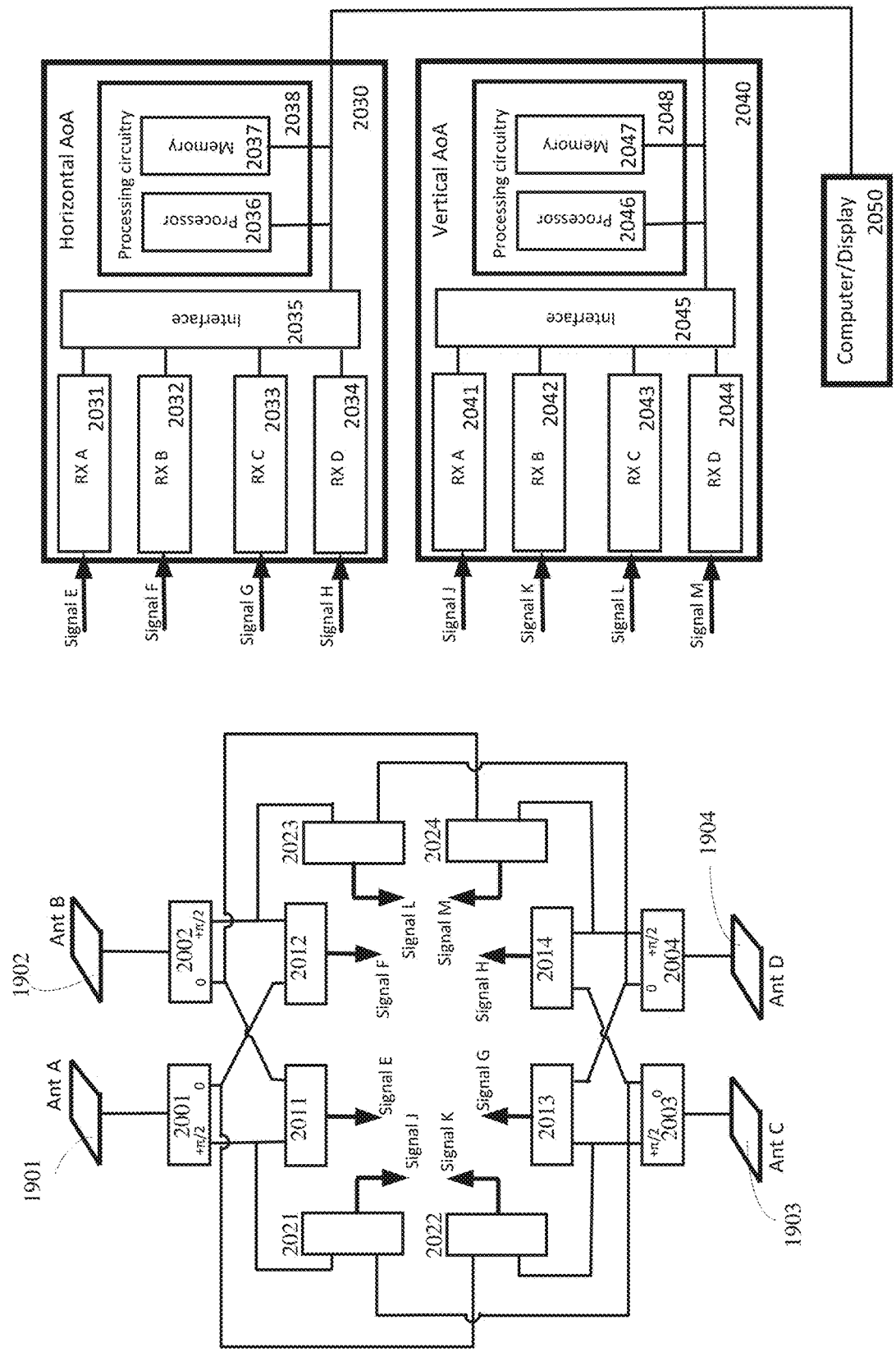

ANTENNA ARRANGEMENTS FOR MEASUREMENT OF ANGLE OF ARRIVAL

CROSS-REFERENCE TO RELATED APPLICATION

This application is related to and claims priority to U.S. Provisional Patent Application Ser. No. 62/548,102, filed Aug. 21, 2017, entitled, "ANTENNA ARRANGEMENTS FOR HIGH ACCURACY MEASUREMENT OF ANGLE OF ARRIVAL", the entirety of which is incorporated herein by reference.

TECHNICAL FIELD

The present disclosure relates to a method and system for antenna arrays and more specifically for determining an angle of arrival of a radio signal in either one plane or in the vertical and horizontal planes of a radio frequency (RF) wave using four RF antennas.

BACKGROUND

Angle of arrival (AoA) measurement is a method for determining the direction of propagation of a radio-frequency wave incident on an antenna array. AoA determines the direction of the transmitted signal and may be determined by measuring the difference in received phase at each element in an antenna array.

FIG. 1 depicts a two element array. Antenna A 10, and antenna B 11, are spaced apart by a distance D. An incoming RF wave 12 (shown as RF signals 12a and 12b) is received at antenna A 10, and at antenna B 11. The incoming RF wave 12 is arriving at an angle θ 14 incident to the plane of the two antennas 10 and 11. The RF signal 12b received at antenna B 11 has travelled further than the RF signal 12a received at antenna A 10 by a distance d 15.

The extra distance travelled by the RF signal, d, is related to the distance between the antennas, D, and the angle of the arrival of the RF signal, θ; using simple geometry:

$$d = D \cos \theta \quad (1)$$

The phase difference φ between the RF signal received at antenna B 11 and the RF signal received at antenna A 10 is:

$$\varphi = d/2\pi\lambda \text{ where } \lambda \text{ is the wavelength of the RF signal.} \quad (2)$$

Hence, $\varphi = D \cos \theta / 2\pi\lambda$ $\cos \theta = \varphi \cdot 2\pi\lambda/D$ $$\text{or } \theta = a \cos(\varphi \cdot 2\pi\lambda/D) \quad (3)$$

The phase difference φ between the two RF signals received at each of the antennas is therefore related to the angle of arrival θ of the RF signal. For example, if the RF signal is coming from a direction directly in front of the two antennas then φ=0 and θ=90° or π/2 radians.

A common method to measure the phase difference φ is to add the signals from both antennas as depicted in FIG. 2. The output from each antenna 10 and 11 is connected to the inputs of an RF adder 21 which provides the sum of the two signals 22 at its output.

If the received signals at antennas 10 and 11 have amplitude A, then the output 22 of the RF adder 21, using simple trigonometry, is:

$$\text{Sum} = A\sqrt{2 + 2\cos\varnothing} \quad (4)$$

If the distance D between the antennas 10 and 11 is arranged to be half a wavelength, D=λ/2, then when the RF signal is coming from a direction from the side of the antennas, θ=0, the two RF signals from the two antennas will be in anti-phase and will cancel out and the result of the summation will be an RF signal of zero amplitude. When the RF signal is coming from the front of the two antennas, θ=π/2, then the two RF signals will add in phase and the result of the summation will be an RF signal at the maximum amplitude. FIG. 3 shows a graphical representation 30 of the amplitude of the RF signal 22 at the output of the RF adder 21 as the angle of arrival varies from 0 to 180 degrees.

FIG. 4 shows a graphical representation 40 of the amplitude of the RF sum signal 22 at the output of the RF sum block 21 plotted against angle of arrival as the angle of arrival varies from 0 to 180 degrees and when the distance D between the antennas 10 and 11 is set to one wavelength, D=λ. Note that the amplitude is at a maximum at angles of arrival 0, 90 and 180 degrees, and at a minimum at angles of arrival 60 and 120 degrees.

A common method to measure the angle of arrival is to rotate the two antennas around their axis such that the sum of the received signals is at a maximum and hence the direction of the incident wave is known. The accuracy of this approach can be increased by using two directional antennas or by increasing the distance between the two antennas which results in a narrower front beam width but also more than one maximum. A disadvantage of this approach is that the antenna assembly needs to be rotated, the accuracy is limited by the directionality of the individual antennas. Also, increasing the directionality of the antenna necessitates that the size of each antenna increases. For example, the beam width of an antenna is related to the gain of the antenna; the narrower the beam width, the higher the gain. For example a patch antenna consists of a flat rectangular sheer or "patch" of metal, mounted over a larger sheet of metal called a ground plane. An example of a patch antenna at 2.4 GHz has a gain of about 8 dBi, a 3 dB beam width of about 60 degrees and has side lengths of about 4 inches. An array of 4 patch antennas, side by side, would be in the order of 12 to 16 inches in length and would have a horizontal beam width of about 20 degrees. Achieving a narrow beam width in the order of approximately 5 degrees requires a linear array of 16 patch antennas. This antenna array could have a length of about 64 inches.

SUMMARY

A method and receiver for high accuracy determination of angle of arrival in one or two planes of a beam received at an antenna array comprising at least two pairs of antenna elements are provided. In some embodiments, a method includes computing a pair of difference signals, each difference signal being computed from signals from a different one of the at least two pairs of antenna elements. The method further includes determining a directional angle of arrival of the beam in one plane based on the pair of difference signals.

According to one aspect, a method for determining an angle of arrival of a beam received at an antenna array, the antenna array having at least two antenna elements is provided. The method includes receiving a first signal at an antenna element A, and receiving a second signal at an antenna element B. The method also includes producing, via a first network, a first output signal E based on a first combination of the first and second signals and producing, via the first network, a second output signal F based on a second combination of the first and second signals. The method also includes determining a difference of first output signal E and second output signal F to produce a first difference signal (DIFF AB). The method also includes receiving a third signal at an antenna element C, and receiving a fourth signal at an antenna element D. The method also includes producing, via a second network, a third output signal G based on a first combination of the third and fourth signals and producing, via the second network, a fourth output signal H based on a second combination of the third and fourth signals. The method further includes determining a difference of third output signal G and fourth output signal H to produce a second difference signal (DIFF CD), and determining a first directional angle of arrival of the beam from a first set of candidate angles of arrival based at least in part on the first difference signal (DIFF AB) and the second difference signal (DIFF CD).

According to this aspect, in some embodiments, the method further includes producing, via a third network, a fifth output signal J based on a first combination of the first and third signals and producing, via the third network, a sixth output signal K based on a second combination of the first and the third signals. In these embodiments, the method further includes determining a difference of fifth output signal J and sixth output signal K to produce a third difference signal (DIFF AC). The method may further include producing, via a fourth network, a seventh output signal L based on a first combination of the second and fourth signals and producing, via the fourth network, an eighth output signal M based on a second combination of the second and fourth signals. The method may further include determining a difference of seventh output signal L and eighth output signal M to produce a second difference signal (DIFF BD). The method may further include determining a second directional angle of arrival of the beam from a second set of candidate angles of arrival based at least in part on the first difference signal (DIFF AC) and the second difference signal (DIFF BD).

In some embodiments, antenna elements A and B are at different distances from a reference plane and antenna elements C and D are at different distances from the reference plane. In some embodiments, a separation of the antennas elements A and B is a first distance and a separation of the antenna elements C and D is a second distance different from the first distance. In some embodiments, the antenna elements C and D are at an obtuse angle with respect to the antenna elements A and B. In some embodiments, the first directional angle of arrival is a horizontal angle of arrival and the second directional angle of arrival is a vertical angle of arrival. In some embodiments, the first network includes two 90 degree splitters and two zero degree combiners, each zero degree combiner configured to receive inputs from both 90 degree splitters. In some embodiments, a candidate angle of arrival is determined based on one of formulas and values in a look up table.

According to another aspect, a receiver for determining an angle of arrival of a beam received at an antenna array of the receiver, the antenna array having at least two antenna elements. The receiver includes an antenna element A configured to receive a first signal, an antenna element B configured to receive a second signal, an antenna element C configured to receive a third signal and an antenna element D configured to receive a fourth signal. The receiver also includes a first network configured to produce a first output signal E based on a first combination of the first and second signals and configured to produce a second output signal F based on a second combination of the first and second signals. The receiver also includes a second network configured to produce a third output signal G based on a first combination of the third and fourth signals and configured to produce a fourth output signal H based on a second combination of the third and fourth signals. The receiver also includes a processor configured to: determine a difference of the first output signal E and the second output signal F to produce a first difference signal (DIFF AB); determine a difference of the third output signal G and the fourth output signal H to produce a second difference signal (DIFF CD); and determine a first directional angle of arrival of the beam from a first set of candidate angles of arrival based at least in part on the first difference signal (DIFF AB) and the second difference signal (DIFF CD).

According to this aspect, in some embodiments, the receiver further includes a third network configured to produce a fifth output signal J based on a first combination of the first and third signals and configured to produce a sixth output signal K based on a second combination of the first and third signals. In these embodiments, the receiver further includes a fourth network configured to produce a seventh output signal L based on a first combination of the second and fourth signals and configured to produce an eighth output signal M based on a second combination of the second and fourth signals. The processor may further be configured to determine a difference of fifth output signal J and sixth output signal K to produce a third difference signal (DIFF AC); determine a difference of seventh output signal L and eighth output signal M to produce a second difference signal (DIFF BD); and determine a second directional angle of arrival of the beam from a second set of candidate angles of arrival based at least in part on the first difference signal (DIFF AC) and the second difference signal (DIFF BD).

In some embodiments, the antenna elements A and B are at different distances from a reference plane and the antenna elements C and D are at different distances from the reference plane. In some embodiments, a separation of the antennas elements A and B is a first distance and a separation of the antenna elements C and D is a second distance different from the first distance. In some embodiments, the antenna elements A and B are at an obtuse angle with respect to the antenna elements C and D. In some embodiments, the first directional angle of arrival is a horizontal angle of arrival and the second directional angle of arrival is a vertical angle of arrival. In some embodiments, the first network includes two 90 degree splitters and two zero degree combiners, each zero degree combiner configured to receive inputs from both 90 degree splitters. In some embodiments, a candidate angle of arrival is determined based on one of formulas and values in a look up table.

According to yet another aspect, a method in a receiver configured to determine an angle of arrival of a beam is provided. The method includes receiving a first signal at an antenna element A, receiving a second signal at an antenna element B, receiving a third signal at an antenna element C, and receiving a fourth signal at an antenna element D. The method also includes producing, via a first network, a first output signal E based on a first combination of the first and second signals and producing, via the first network, a second output signal F based on a second combination of the first and second signals, the first network having first and second 90 degree splitters and first and second combiners, the first and second splitters and first and second combiners configured to receive the first and second signals at input ports of the first and second splitters, respectively, and to produce the first output signal E and the second output signal F at different output ports of the first and second combiners. The method also includes producing, via a second network, a third output signal G based on a first combination of the third and fourth signals and producing, via the second network, a fourth output signal H based on a second combination of the third and fourth signals, the second network having third and fourth 90 degree splitters and third and fourth combiners, the third and fourth splitters and third and fourth combiners configured to receive the third and fourth signals at input ports of the third and fourth splitters, respectively, and to produce the third output signal G and the fourth output signal H at different output ports of the third and fourth combiners. The method further includes determining a difference of first output signal E and second output signal F to produce a first difference signal (DIFF AB). The method also includes determining a difference of third output signal G and fourth output signal H to produce a second difference signal (DIFF CD). The method also includes determining a first directional angle of arrival of the beam from a set of candidate angles of arrival based at least in part on the first difference signal (DIFF AB) and the second difference signal (DIFF CD).

According to this aspect, in some embodiments, the antenna elements A, B, C and D are patch antenna elements positioned at different distances away from a ground plane. In some embodiments, the method also includes determining the first difference signal DIFF AB by computing a ratio of the first output signal E to the second output signal F. In some embodiments, the method also includes determining the second difference signal DIFF CD by computing a ratio of the third output signal G to the fourth output signal H.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 18 is a diagrammatical depiction of the error distances resulting from the DIFF values shown in FIG. 17;

FIG. 20 is a diagrammatic representation of an embodiment of an example system comprising four patch antennas, antenna A, antenna B, antenna C, and antenna D.

DETAILED DESCRIPTION

This disclosure relates to the discrimination of signal angle of arrival by ratio of oppositely phased combinations of signals from pairs of antennas.

Figure 5:
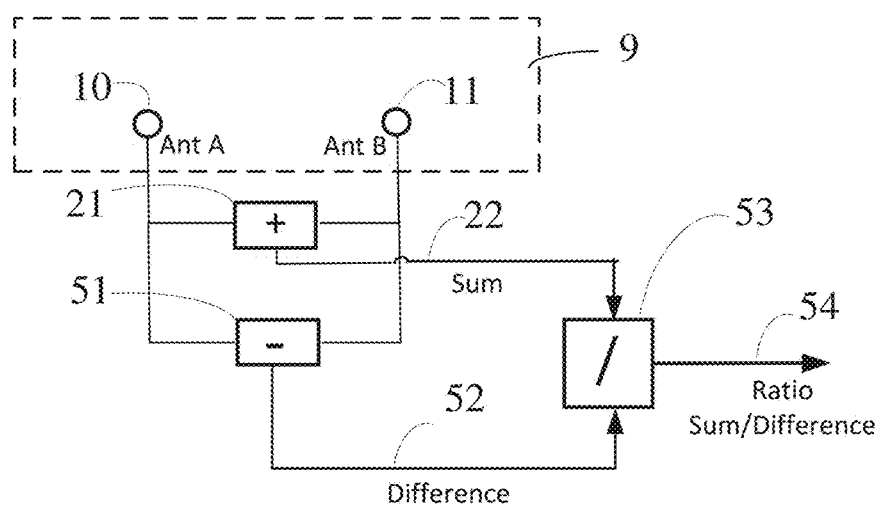
FIG. 5 is a schematic diagram describing an embodiment of the disclosure where, in addition to deriving the sum of the two incident waves, the difference between the received signals at the two antennas is taken.

FIG. 5 is a schematic diagram describing an embodiment of the disclosure. Referring to FIG. 5, in addition to deriving the sum of the two incident waves, the difference between the received signals at the two antennas 10 and 11 of an antenna array 9 is also derived. The output from each antenna 10 and 11 is connected to the inputs of an RF adder 21 which provides the sum of the two signals 22 at its output. The output from each antenna 10 and 11 is also connected to the inputs of an RF subtractor 51 which provides the difference of the two signals 52 at its output. The ratio of the sum signal 22 and the difference signal 52 is then derived in block 53. The ratio of the sum and difference signals 54 is then outputted from block 53.

If the received signals at antennas 10 and 11 have amplitude A, then the output of the RF difference block 52, using simple trigonometry, can be shown to be:

$$\text{Difference} = A\sqrt{2 - 2\cos\varnothing} \tag{5}$$

Hence the ratio 54 is:

$$\text{Sum/Difference} = \frac{\sqrt{2}\,A\sqrt{1+\cos\varnothing}}{\sqrt{2}\,A\sqrt{1-\cos\varnothing}} \tag{6}$$

$$\text{Sum/Difference} = \frac{\sqrt{1+\cos\phi}}{\sqrt{1-\cos\phi}} \quad (7)$$

Note that the ratio formula (7) is independent of the amplitude A of the incident signal.

Figure 6:
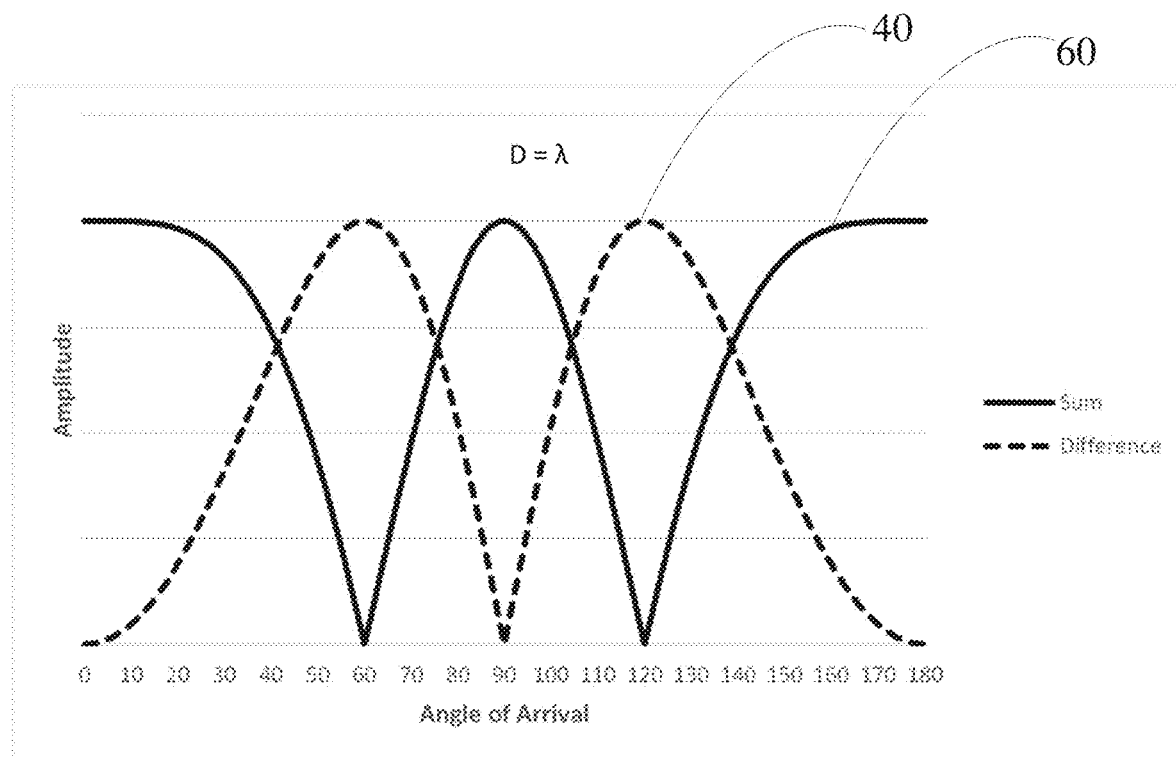
FIG. 6 is a graphical representation of the sum and the difference signals plotted against angle of arrival when the separation between the two antennas is one wavelength.

FIG. 6 is a graphical representation of the sum 40 and the difference 60 signals plotted against angle of arrival when the separation between the two antenna, 10 and 11, is one wavelength. As can be seen, the ratio sum/difference is at a maximum at 0, 90 and 180 degrees (where the sum is at a maximum and the difference is zero) and at a minimum at 60 and 120 degrees (where the sum is zero).

In practice, the actual measurement of the amplitudes of the sum and difference signals may be performed by an RF receiver. It is common practice for an RF receiver to measure the received signal strength of an RF input signal. This value is commonly referred to as the received signal strength indicator (RSSI) and is usually expressed in dBm.

The method of taking the ratio of the two signals produced by combining the outputs from two antennas is such that there are several manners in which combinations and methods of combining can be enabled. For example, the 'sum' signal is the addition of the output signal from antenna A 10 shifted by zero degrees and the output signal from antenna B 11 shifted by zero degrees, and the 'difference' signal can be the addition of the output signal from antenna A 10 shifted by zero degrees and the output signal from antenna B 11 shifted by 180 degrees. Similarly, the 'difference' signal could be produced by the addition of the output signal from antenna A 10 shifted by 90 degrees, and the output signal from antenna B 11 shifted by −90 degrees. In fact, any symmetrical and opposite shifting of the antenna output signals can be used but the optimum results are achieved when the shifts are in increments of 90, 180 or 270 degrees. In addition, in order to keep the differential losses and phases of the combining circuitry to a minimum, the signal paths from antennas A 10 and B 11 to RF adder 21 and RF subtractor 51 should be of equal length, as should the signal paths from RF adder 21 and RF subtractor 51 to block 53. Also, identical combining elements in each signal path should be used.

Figure 7:
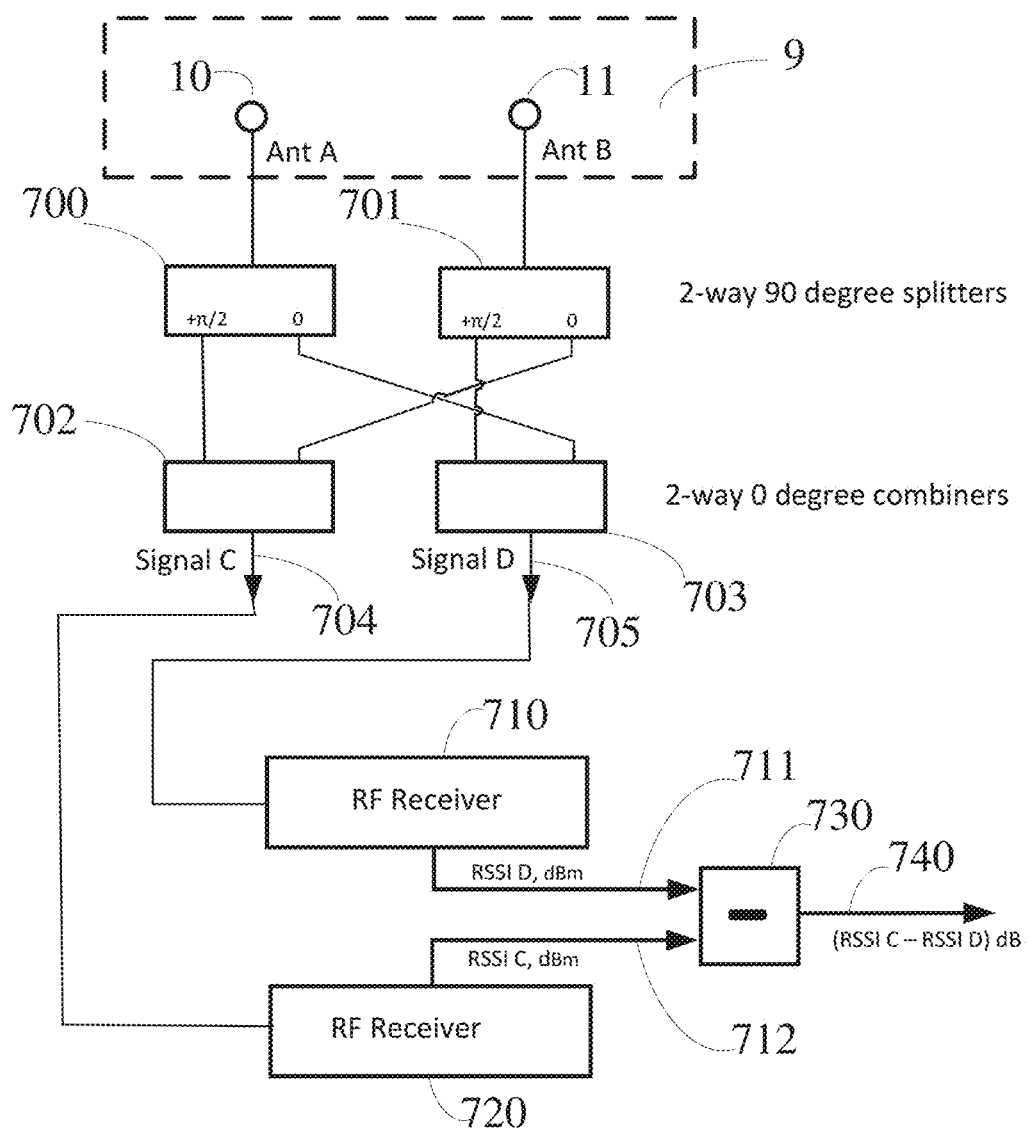
FIG. 7 is a diagram depicting an exemplary implementation with common combining elements used in each path.

FIG. 7 is a diagram depicting an exemplary implementation with common combining elements used in each path. The signals from antenna A 10 and antenna B 11 of an antenna array 9 are each applied to the input of a 2-way 90 degree splitter, 700 and 701 respectively. The +90 degree output from splitter 700 is connected to one input of a 2-way 0 degree combiner 702. Similarly, the +90 degree output from splitter 701 is connected to one input of a 2-way 0 degree combiner 703. The 0 degree output from splitter 700 is connected to the other input of combiner 703 whereas the 0 degree output from splitter 701 is connected to the other input of combiner 702. Hence the signal C 704 at the output of splitter 702 is the sum of the signal from antenna A 10 shifted by +90 degrees, and the signal from antenna B 11 shifted by 0 degrees. Similarly, the signal D 705 at the output of splitter 703 is the sum of the signal from antenna A 10 shifted by 0 degrees, and the signal from antenna B 11 shifted by +90 degrees. Signal C 704 is input to RF receiver 720 and signal D is input to RF receiver 710. The RSSI 712 for signal C 704, is measured and outputted by RF receiver 720, whereas the RSSI 711 for signal D 705 is measured and outputted by RF receiver 710. In block 730, the two RSSI values are subtracted to produce the DIFF signal 740. In practice, the subtraction carried out in block 730 may be an operation carried out by a processor or processor circuitry including a processor and memory. 2-way 90 degree splitters are standard RF components and are well known, and similarly 2-way 0 degree RF combiners are also standard RF components and are well known. As such, these components may be fabricated on a printed circuit board, be components soldered or mounted on a printed circuit board, or be coaxial devices connected by RF cables. In FIG. 7, the lengths of the four RF connections between the splitters and the combiners are generally set to be of equal length so as to make the losses and phases symmetrical.

The signals C 704 and D 705 are different from the sum and difference values previously shown. In this case the relevant formulas are:

$$\text{Signal } C = A\sqrt{2+2\sin\phi} \quad (8)$$

$$\text{Signal } D = A\sqrt{2-2\sin\phi} \quad (9)$$

$$\text{Ratio } C/D = \frac{\sqrt{1+\sin\phi}}{\sqrt{1-\sin\phi}} \quad (10)$$

In the following descriptions the signal that corresponds to the (1+sin φ) term is referred to as the "sum" and the signal that corresponds to the (1−sin φ) term is referred to as the "difference".

Figure 8:
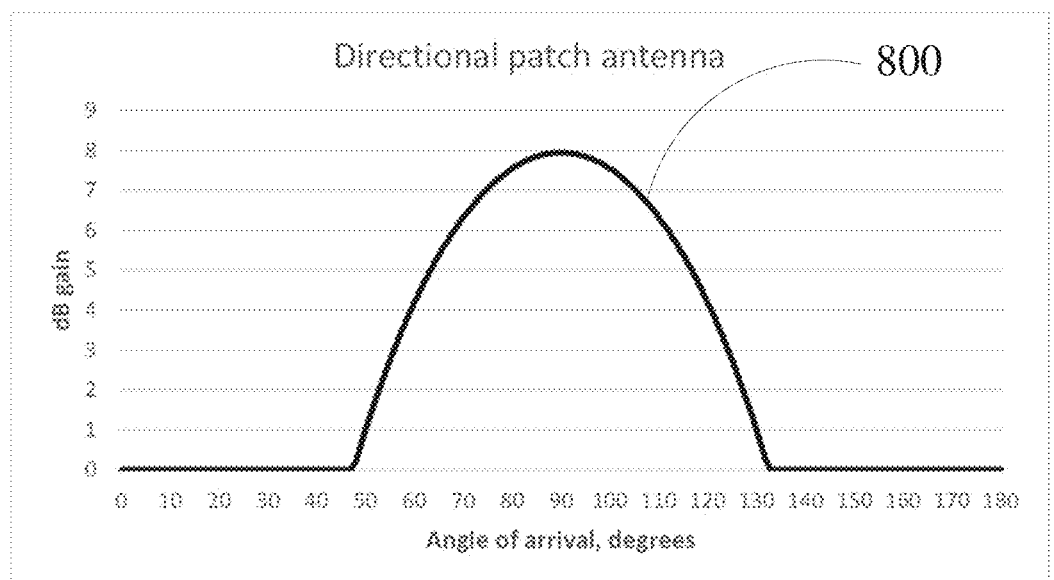
FIG. 8 is a graphical representation of the gain of a standard patch antenna against the angle of arrival.

The analysis presented so far has assumed that antennas 10 and 11 have constant gain across the angles of arrival 0 to 180 degrees. Such omni-directional antennas could also have the same gain for angles of arrival 0 to 360 degrees. In order to distinguish the general direction of the source of the transmission, directional antennas may be used, for example, patch antennas. FIG. 8 is a graphical representation 800 of the gain of an ideal patch antenna against the angle of arrival. In this case, the patch antenna has a maximum gain of about 8 dBi at the boresight, 90 degrees, a 3 dB bandwidth of about 55 degrees, and is unidirectional, i.e., for angles of arrival 180 to 360 degrees, the gain is effectively 0 dB.

Figure 9:
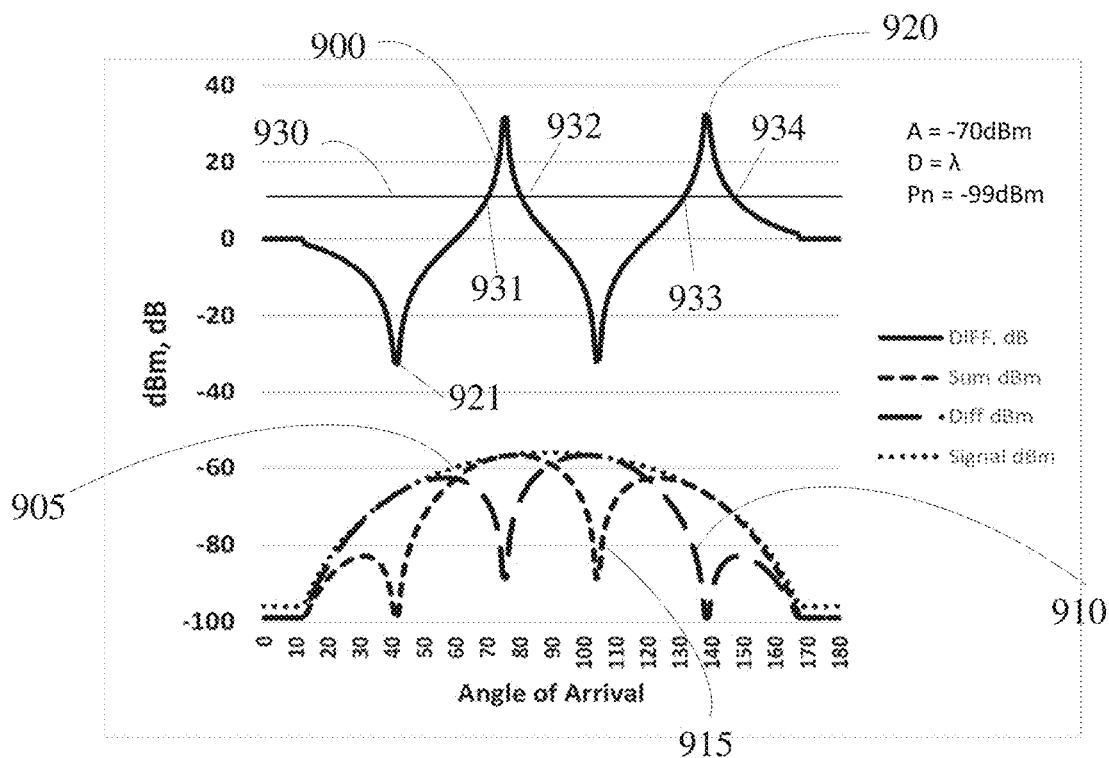
FIG. 9 is a graphical representation of the sum, difference and DIFF values plotted against angle of arrival when the amplitude of the incident signal A=−70 dBm, and the separation of the two antennas, is one wavelength, i.e. $D=\lambda$.

FIG. 9 is a graphical representation of the sum 915, difference 910 and DIFF 900 values plotted against angle of arrival when the amplitude of the incident signal A=−70 dBm, and the separation of the two antennas 10 and 11, is one wavelength, i.e. D=λ. The sum 915 and the difference 910 is displayed in dBm, and the DIFF 900 is displayed in dBs. The minimum value for the sum and difference signal strengths, is limited by the noise floor of the receiver. In this example, the noise floor is assumed to be −99 dBm hence the minimum value of the sum 915 and difference 910 is limited to −99 dBm. For a measured value of DIFF, for example 10 dB 930, there are four possible angles of arrival 931, 932, 933 and 934. It should be noted that in general the measurement of RSSI by an RF receiver will be in integers of one decibel.

Figure 10:
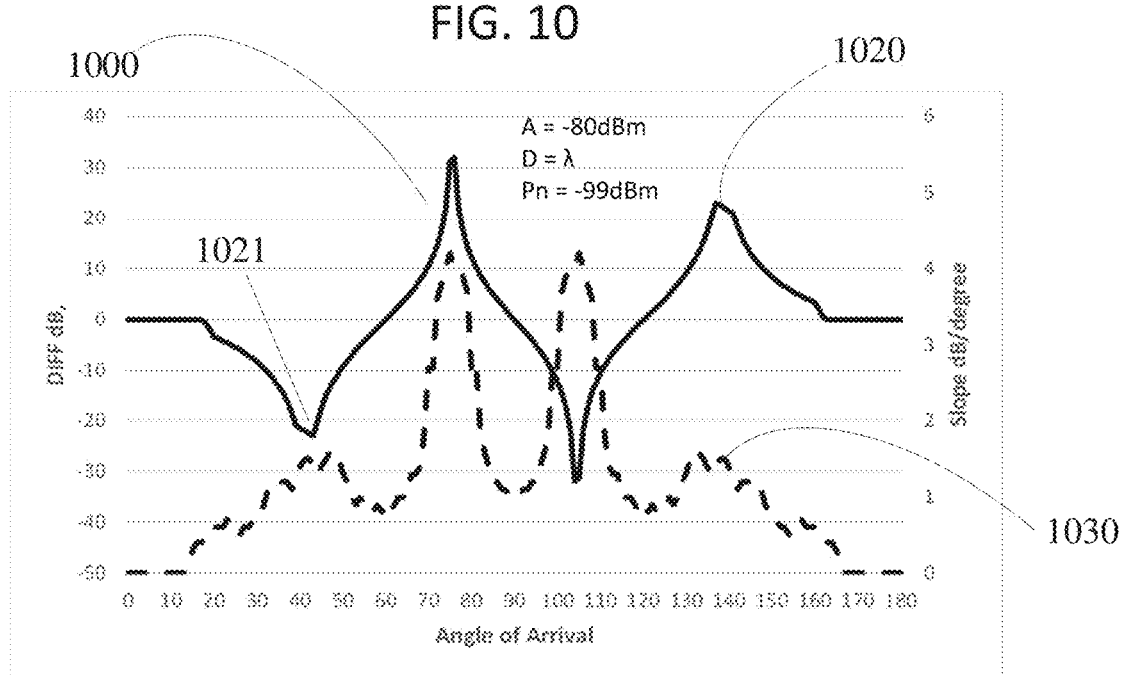
FIG. 10 is a graphical representation of the sum, difference, DIFF and the slope of the DIFF values plotted against angle of arrival, when the amplitude of the incident signal A=−80 dBm, and the separation of the two antennas, is one wavelength, i.e. $D=\lambda$.

FIG. 10 is a graphical representation of the DIFF 1000 values plotted against angle of arrival, when the amplitude of the incident signal A=−80 dBm, and the separation of the two antennas 10 and 11, is one wavelength, i.e. D=λ. The noise floor is again assumed to be −99 dBm. It may be noted that because of the lower amplitude of the input signal, the maximum and minimum values, 1020 and 1021, respectively, of the DIFF 1000, are less than the maximum and minimum values 920 and 921 of the DIFF 900, respectively, as shown in FIG. 9 where the input signal amplitude is −70 dBm. However, it should be noted that with the exception of this effective flattening of the DIFF value at the narrow range of values where the minimum values for the sum and difference signals are limited by the noise floor of the receiver, the values of the DIFF 900 and 1000 are identical between FIG. 9 and FIG. 10. Hence, as predicted by formula (10), the DIFF value is effectively independent of the amplitude of the input signal.

FIG. 10 is a graphical representation 1030 of the accuracy of the measurement of the angle of arrival in dB and the slope of the DIFF 1000 in dB/degree plotted against angle of arrival. The vertical axis for the slope is on the right-hand side of the graph. For angles of arrival between 30 and 150 degrees, the slope is in the order of 1 dB/degree or higher. Therefore, in theory, as the DIFF measurement is in increments of 1 dB, the accuracy is in the order of 1 degree over the range 30 to 150 degrees. In practice, a variation of ±1 dB may be expected in the individual RSSI measurements of the sum and difference signals, which would result in a variation of ±2 dB in the DIFF measurement, equivalent to about ±2 degrees/dB accuracy, which may be improved by averaging the results over time. This accuracy is equivalent to the use of highly directional antennas which would have correspondingly relatively large dimensions, but allows implementation using antennas with smaller dimensions using the arrangements described herein.

Figure 11:
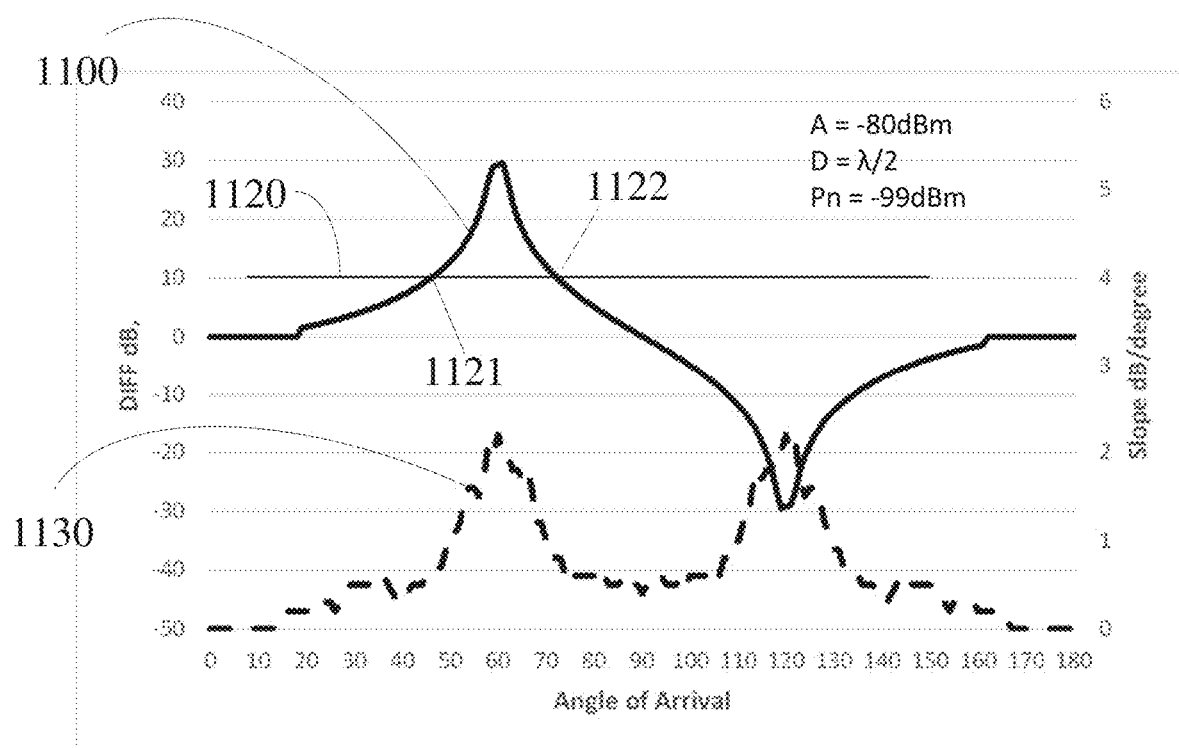
FIG. 11 is a graphical representation of the DIFF in dB plotted against angle of arrival.

FIG. 11 is a graphical representation of the DIFF 1100 in dB, plotted against angle of arrival, when the amplitude of the incident signal A=−80 dBm, and the separation of the two antennas 10 and 11, is one half wavelength, i.e. D=λ/2. For a measured value of DIFF 1100, for example 10 dB 1120, there will be just two possible angles of arrival 1121 and 1122 as compared to FIG. 9 where there are four possible angles of arrival 921, 922, 923 and 924.

FIG. 11 is also a graphical representation 1130 of the accuracy of the measurement of the angle of arrival in dB, and the slope of the DIFF 1100 in dB/degree plotted against angle of arrival. The vertical axis for the slope is on the right-hand side of the graph. For angles of arrival between 30 and 150 degrees the slope is in the order of 0.5 dB/degree or higher. Therefore, in theory, as the DIFF measurement is in increments of 1 dB, the accuracy is in the order of 2 degrees over the range 50 to 130 degrees. In practice, a variation of ±1 dB may be expected in the RSSI measurements of the sum and difference signals, which would result in a variation of ±2 dB in the DIFF measurement, equivalent to about ±4 degrees/dB accuracy, which may be improved by averaging the result over time.

By observation of FIG. 9 and FIG. 11, comparing the number of possible angles of arrival per DIFF measurement and the accuracy of the measurement of the angle of arrival, it can be seen that as the distance D is increased from half a wavelength to one wavelength, the number of possible angles of arrival, for a particular value of DIFF, increases from 2 to 4, but the accuracy of the measurement improves from about ±4 degrees/dB to ±2 degrees/dB. In general, the method of shifting and combining the signals from two antennas, as described, can be used with many antenna separations. As the distance between the antennas is varied, the resulting slope of the DIFF signal and the number of possible angles of arrival per DIFF value will vary.

Figure 12:
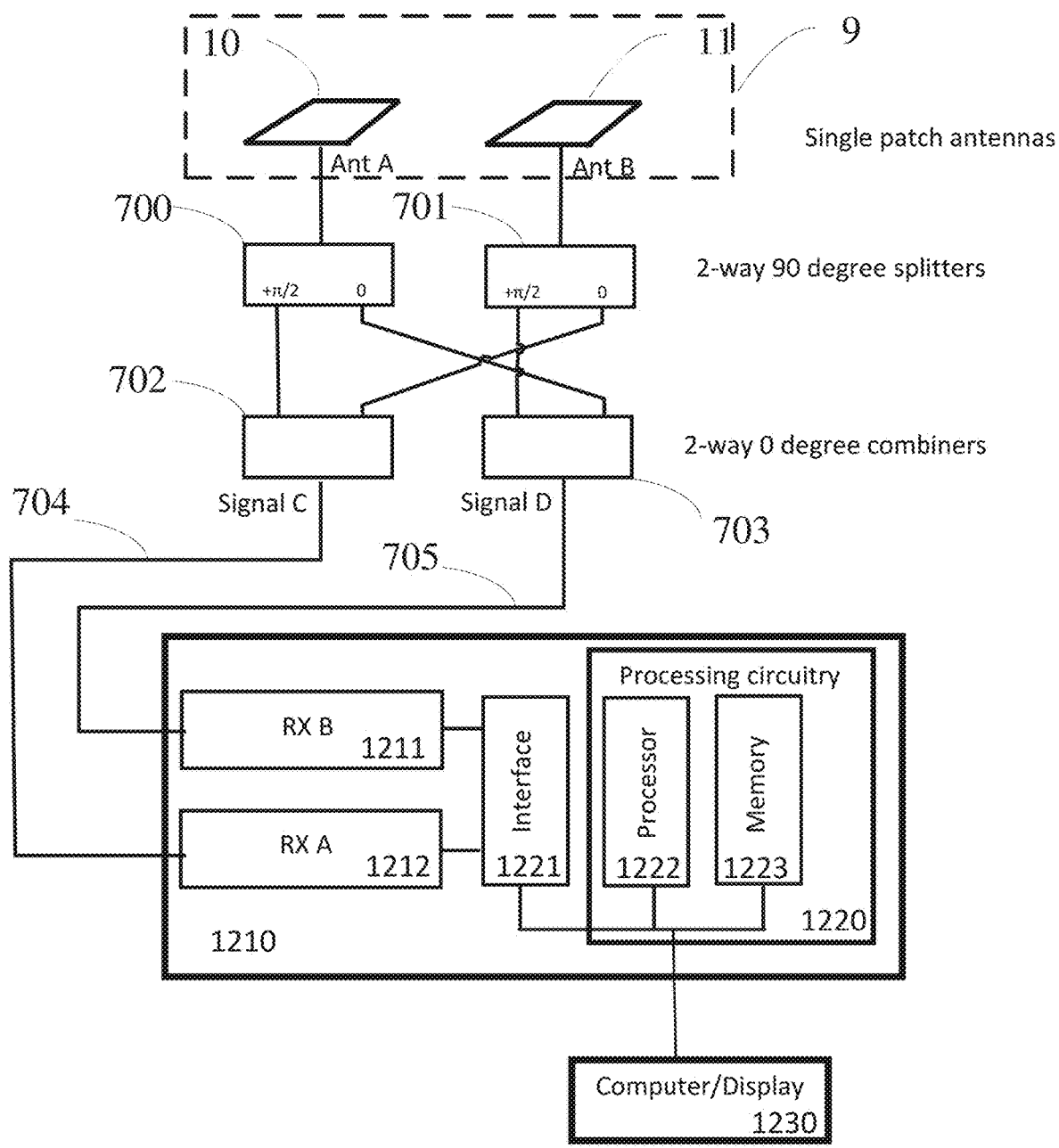
FIG. 12 is a diagrammatic representation of an embodiment of an example system comprising two patch antennas, 2-way 90 degree splitters, 2-way 0 degree combiners.

FIG. 12 is a diagrammatic representation of an embodiment of an example system having two patch antennas 10 and 11, of an antenna array 9, 2-way 90 degree splitters 700 and 701, 2-way 0 degree combiners 702 and 703, producing signal C 704 and signal D 705 in a similar manner to that previously described above with respect to FIG. 7. RF receiver 1210 may include two receivers, RX A 1212 and RX B 1213, an interface 1221, and processing circuitry 1220 including a processor 1222 and memory 1223. Signal C 704 is applied to the input of RX A 1212 and signal D 705 is applied to the input of RX B 1211. The RSSI for each of the signals C 704 and D 705 is measured by RX A and RX B respectively and outputted to the interface 1221. Interface 1221 and processing circuitry 1220, including processor 1222 and memory 1223, may be used to subtract the RSSI values of the signals C 704 and D 705, and produce the value for DIFF as described previously. The interface 1221 and processing circuitry 1220 may also be used to calculate the effective signal strength at antenna 10 and 11. This calculation may be accomplished, for example, by converting the two RSSI values to milliwatts, adding them and then converting the value back to dBm and accounting for the effective gain of the antenna array 9. As described above in FIG. 9 and FIG. 10, the peak values 920, 921, 1021 and 1020 are affected by the antenna output signal level. Hence, a knowledge of the signal level may be used to estimate the peak values and the effective flattening. An alternative is that receiver 1210 comprises a third receiver chain and the output signal from either antenna 10 or 21 is input directly to this third receiver. This however may involve extra RF splitters to be used which may affect the overall sensitivity of the receive chain.

The conversion of the DIFF value to angles of arrival may be carried out in the processing circuitry 1220 or in a computer/display 1230. In one embodiment, the receiver 1210 includes processing circuitry 1220 such as a processor 1222 and a memory 1223 in which the memory 1223 stores instructions that, when executed by the processor 1222, cause the processor 1222 to perform functions described herein to determine the angles of arrival. Similarly, it is contemplated that the computer/display 1230 can include a processing circuitry such as a processor and a memory in which the memory stores instructions that, when executed by the processor, cause the processor to perform functions described herein to determine the angles of arrival.

As described above with respect to FIG. 9 and FIG. 10, one DIFF value may correspond to several possible angles of arrival. In order to determine the actual angle of arrival a second antenna array may be used. One solution is to use a second antenna array where the two antennas are separated by a different distance D to the first array. Another solution is where the second antenna array is tilted at an angle to the first array. This latter solution will be further described herein.

Figure 1:
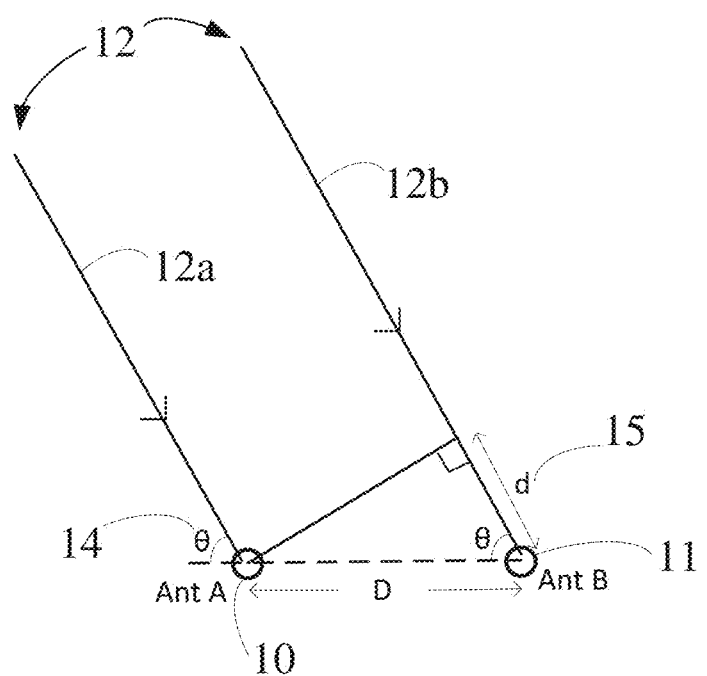
FIG. 1 depicts a two element array spaced apart by a distance of D.
Figure 2:
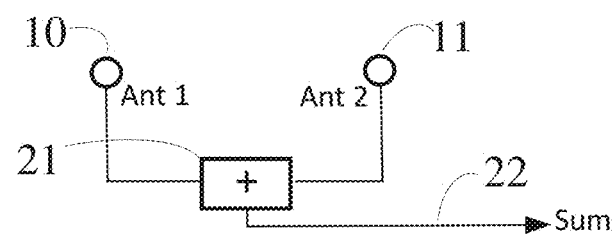
FIG. 2 shows a common method to measure the phase difference by addition of the signals from both antennas.
Figure 3:
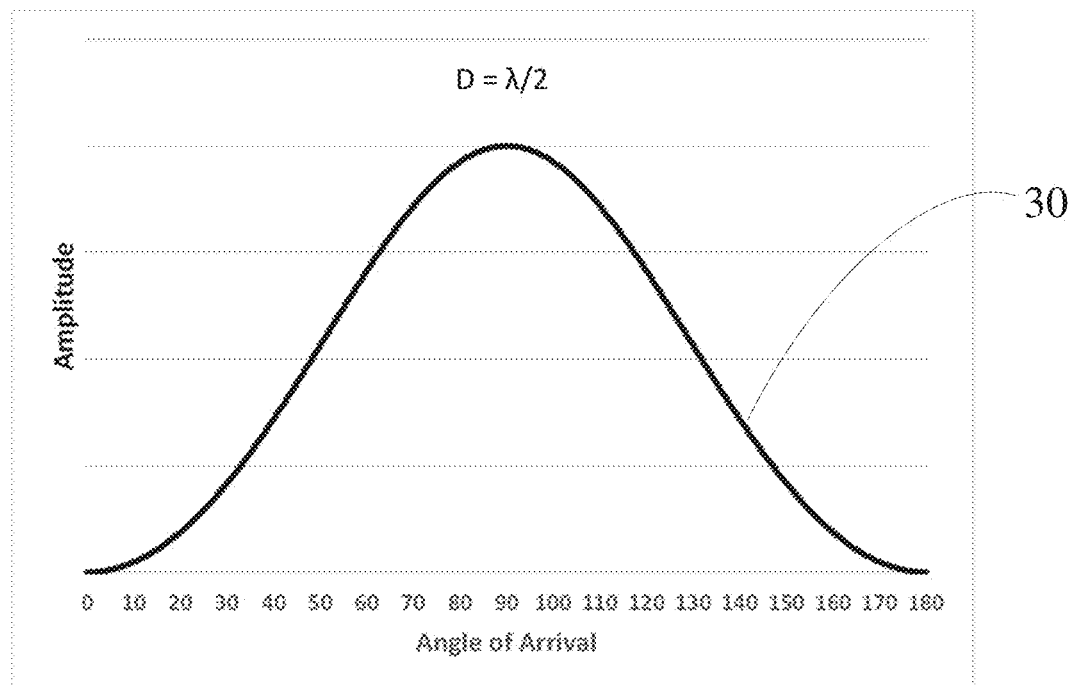
FIG. 3 shows a graphical representation of the amplitude of the RF signal at the output of the RF summation block as the angle of arrival varies from 0 to 180 degrees.
Figure 4:
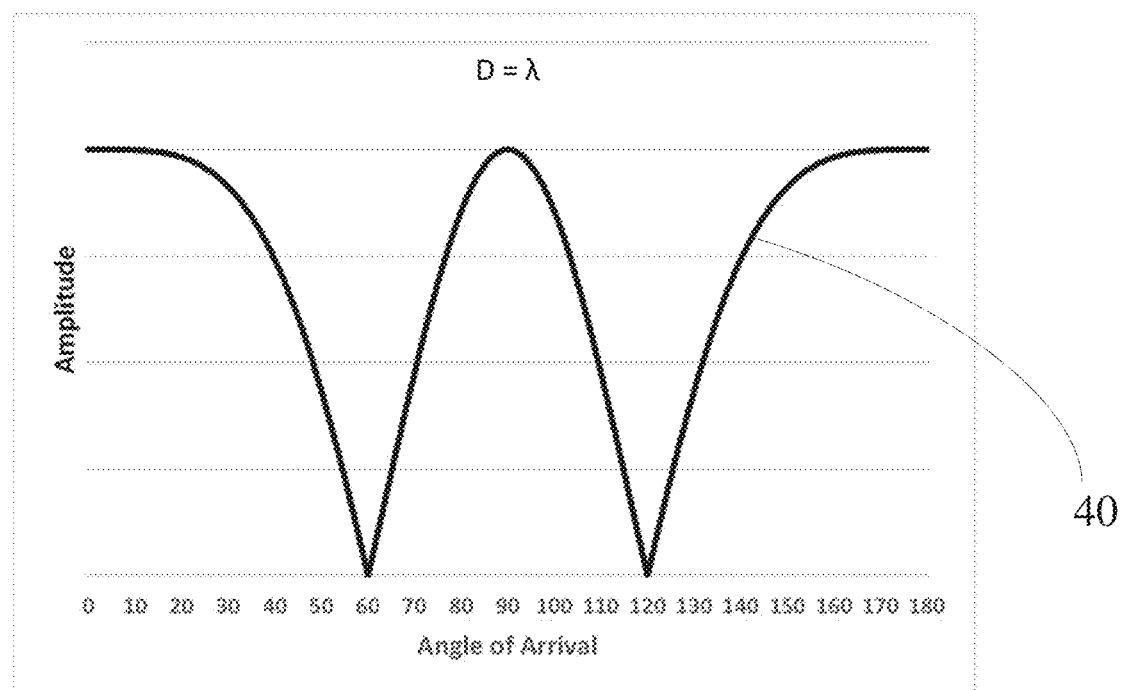
FIG. 4 shows a graphical representation of the amplitude of the RF sum signal at the output of the RF sum block plotted against angle of arrival as the angle of arrival varies from 0 to 180 degrees and when the distance D between the antennas is set to one wavelength, $D=\lambda$.
Figure 13:
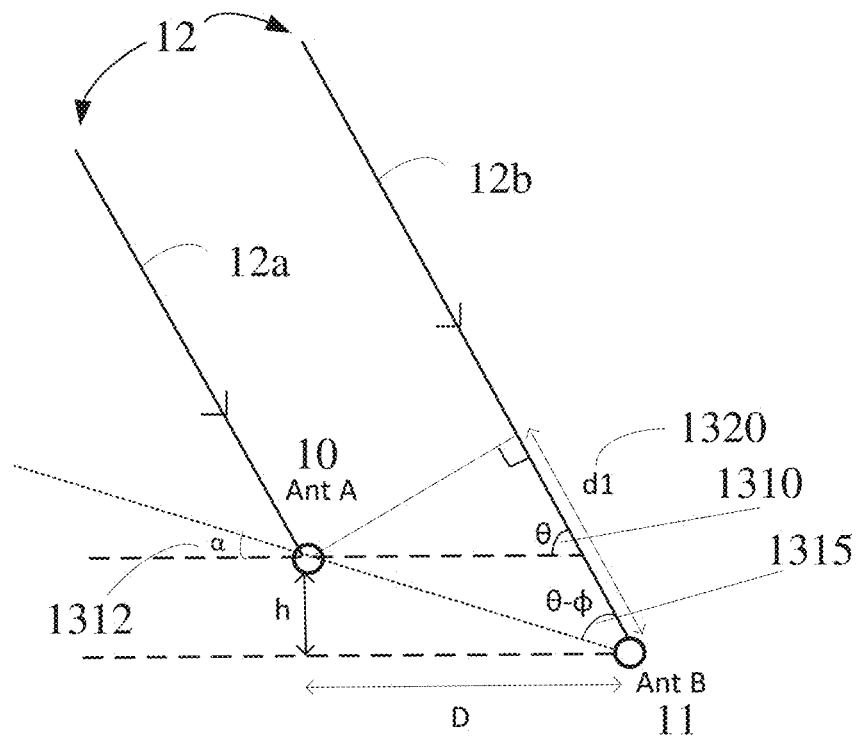
FIG. 13 depicts a two element array similar to that depicted in FIG. 1 but where Antenna A, and antenna, are spaced apart by a horizontal distance D and antenna A is at a vertical height h above antenna B.

FIG. 13 depicts a two element array similar to that depicted in FIG. 1 but where Antenna A 10, and antenna B 11, are spaced apart by a horizontal distance D and antenna A 10 is at a vertical height h above antenna B 11 with reference to the incoming radio wave 12. An incoming RF wave 12 (shown as RF signals 12a and 12b) is received at antenna A 10, and at antenna B 11. The incoming RF wave 12 is arriving at an angle θ 1310 incident to the horizontal plane. In the depicted example the RF signal 12b received at antenna B 11 has travelled further than the RF signal 12a received at antenna A 10 by a distance d1 1320. The tilt angle α 1312 is the angle subtended by the line drawn through the two antennas 10 and 11 and the horizontal plane.

The extra distance travelled by the RF signal, d1 1320, is related to the horizontal distance between the antennas, D, the height h, the angle of the arrival of the RF signal, θ, and the tilt angle α; using simple geometry:

$$d1 = \sqrt{(D^2 + h^2)} \cos(\theta - \alpha) \quad (11)$$

The phase difference φ between the RF signal received at antenna B 11 and the RF signal received at antenna A 10 is:

φ=d1/2πλ where λ is the wavelength of the RF signal.

$$\varphi = \sqrt{(D^2+h^2)}\cos(\theta-\alpha)/2\pi\lambda \quad (12)$$

where α=a tan(h/D)

Figure 14:
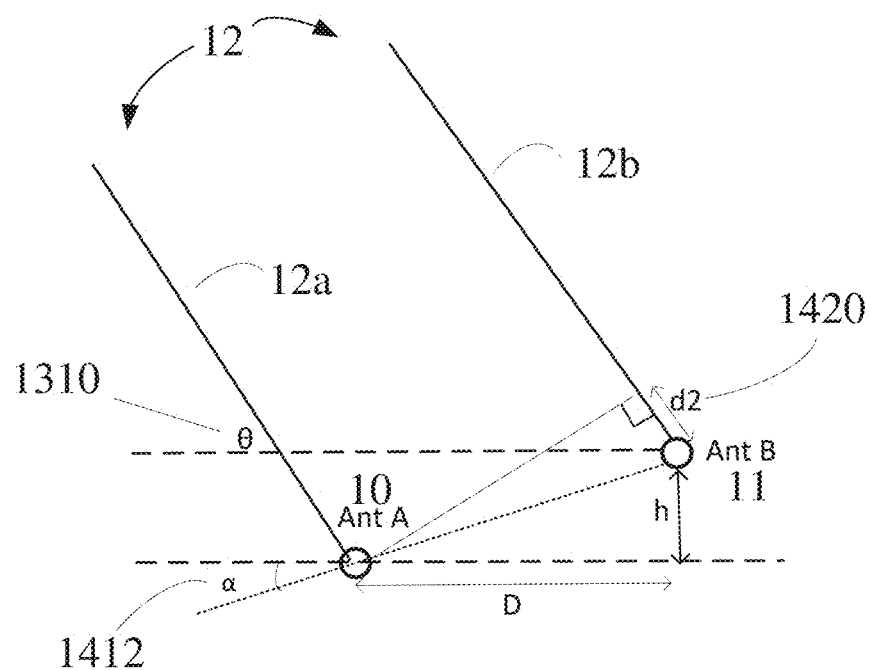
FIG. 14 depicts a two element array similar to that depicted in FIG. 13 but where Antenna A, and antenna B are spaced apart by a horizontal distance D and antenna B is at a vertical height h above antenna A.

FIG. 14 depicts a two element array similar to that depicted in FIG. 13 but where Antenna A 10, and antenna B 11, are spaced apart by a horizontal distance D and antenna B 11 is at a vertical height h above antenna A 10 with reference to the incoming radio wave 12. An incoming RF wave 12 (shown as RF signals 12a and 12b) is received at antenna A 10, and at antenna B 11. The incoming RF wave 12 is arriving at an angle θ 1310 incident to the horizontal plane. In the depicted example, the RF signal 12b received at antenna B 11 has travelled further than the RF signal 12a received at antenna A 10 by a distance d2 1420. The tilt angle is the angle subtended by the line drawn through the two antennas 10 and 11 and the horizontal plane. Because, in this example, the horizontal distance D and the height difference h is the same in FIG. 13 and FIG. 14, the tilt angle 1412 is also equal to α.

The extra distance travelled by the RF signal, d2 1420, is related to the horizontal distance between the antennas, D, the height h, the angle of the arrival of the RF signal, θ, and the tilt angle α; using simple geometry:

$$d2 = \sqrt{(D^2+h^2)}\cos(\theta+\alpha) \quad (13)$$

The phase difference φ between the RF signal received at antenna B 11 and the RF signal received at antenna A 10 is:
φ=d2/2πλ where λ is the wavelength of the RF signal.

$$\varphi = \sqrt{(D^2+h^2)}\cos(\theta+\alpha)/2\pi\lambda \quad (14)$$

where α=a tan(h/D)

Figure 15:
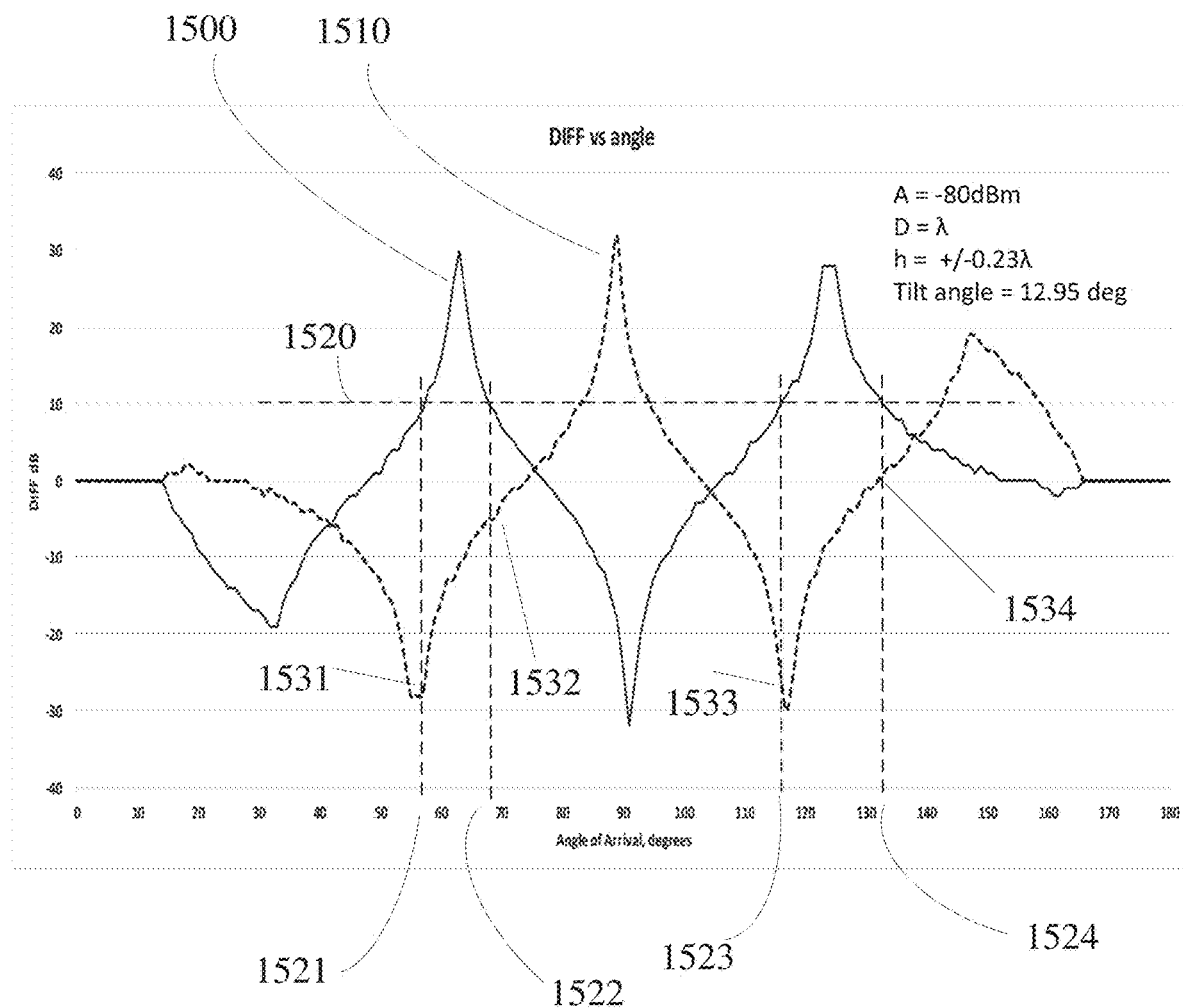
FIG. 15 is a graphical representation of the DIFF values plotted against angle of arrival, for the two antenna arrays as depicted in FIG. 13 and FIG. 14 respectively.

FIG. 15 is a graphical representation of the DIFF values 1500 and 1510 plotted against angle of arrival, for the two antenna arrays as depicted in FIG. 13 and FIG. 14 respectively. The horizontal separation of the two antennas 10 and 11 is one wavelength, D=λ, and the vertical separation h=±0.23λ. The amplitude of the incident signal A=−80 dBm and the noise floor is again assumed to be −99 dBm. As noted before, in reference to FIG. 9, there are four possible angles of arrival for a particular value of DIFF 1500. A DIFF value 1520 of 10 dB is depicted in FIG. 15. This results in four possible angle of arrival values, 1521, 1522, 1523, and 1524, in this case about 57, 68, 116 and 133 degrees respectively. However, at the angles of arrival 1521, 1522, 1523, and 1524 the respective values 1531, 1532, 1533, and 1534 for DIFF 1510 are −28, −5, −25, and 1 dB respectively. Hence, if, for example, the true angle of arrival was 68 degrees, then the two DIFF values, 1520 and 1532 are 10 and −5, respectively, and there is just one solution.

It is difficult to establish by inspection of the graph whether there are angles of arrival that have more than one solution. As shown in FIG. 15, for each angle of arrival, there are two DIFF values, for example, when AoA=68 degrees, DIFF of 1510=−5 and DIFF of 1500=10. In order to determine if the same two values result for any other AoA, the two DIFF values for every angle, from 30 degrees to 150 degrees can be compared to the 68 degree result (−5, 10).

For example, let DIFF 1510=Aθ and DIFF 1500=Bθ where θ=AoA.
For θ=68, DIFF 1510=A68 and DIFF 1500=B68
For γ=30 to 150 in steps of 1, Calculate V=ABS (A68−Aγ)+ABS(B68−Bγ)

Hence, when γ=68, V=0, but at all other values for γ, in this example, V is always >0. The value V is an indication of the error distance.

Figure 16:
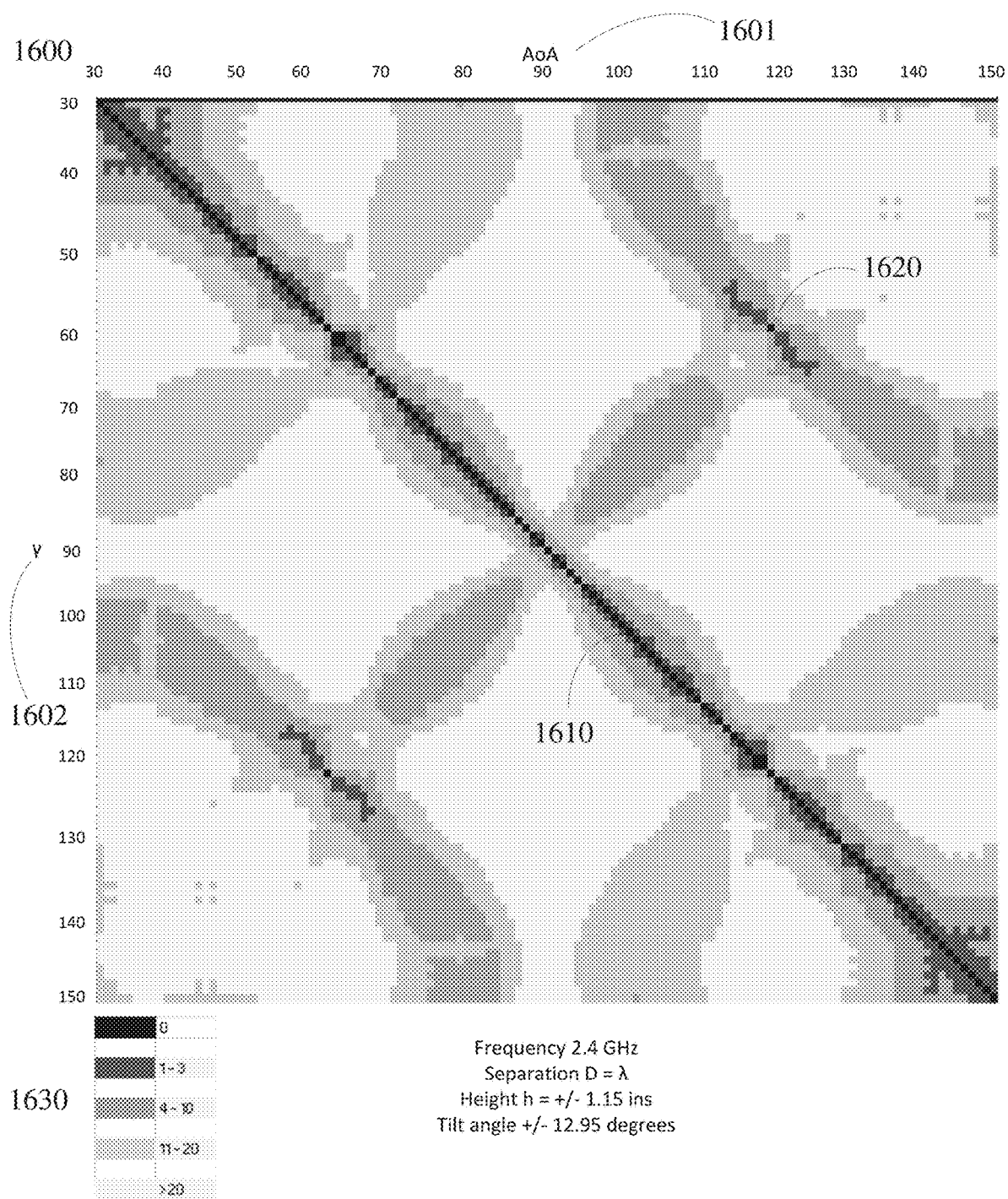
FIG. 16 is a diagrammatical depiction of the error distances resulting from the DIFF values shown in FIG. 15.

FIG. 16 is a diagrammatical depiction, 1600, of the error distances resulting from the DIFF values shown in FIG. 15. The horizontal axis 1601 is the angle of arrival, AoA, and the vertical axis 1602 is γ. The value V is calculated for every AoA 30 to 150 degrees in 1 degree steps, for λ=30 to 150 and the result displayed as a shade of grey. Black represents V=0 and then the shade becomes progressively lighter as V increases. The shade key 1630 is shown. The black diagonal 1610 is in the vicinity of the condition γ=AoA. In this example, there is only one result 1620 where V=0 outside of the diagonal 1610. This corresponds to the condition when AoA=60 degrees or 120 degrees, which both have the same result, DIFF A=−16 and DIFF B=16.

Figure 17:
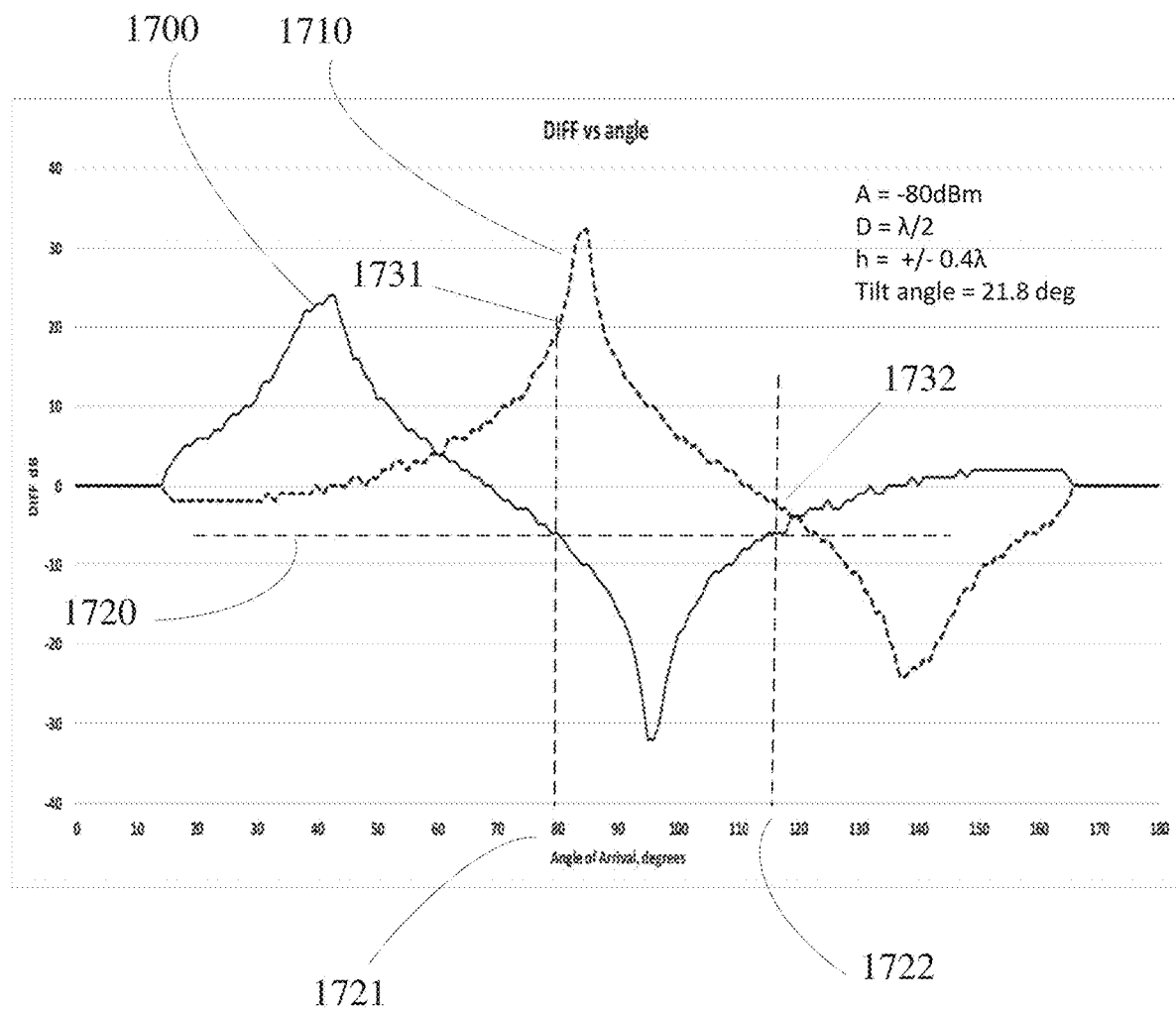
FIG. 17 is a graphical representation of the DIFF values plotted against angle of arrival, for the two antenna arrays as depicted in FIG. 13 and FIG. 14 respectively.

FIG. 17 is a graphical representation of the DIFF values 1700 and 1710 plotted against angle of arrival, for the two antenna arrays as depicted in FIG. 13 and FIG. 14, respectively. The horizontal separation of the two antennas 10 and 11, in this case, is one half wavelength, D=λ/2, and the vertical separation h=±0.4λ. The amplitude of the incident signal A=−80 dBm and the noise floor is again assumed to be −99 dBm. There are only two possible angles of arrival for a particular value of DIFF 1700. A DIFF value 1720 of −6 dB is depicted in FIG. 17. This results in two possible angle of arrival values, 1721, and 1722, in this case about 80 and 116 degrees respectively. However, at the angles of arrival 1721, and 1722 the respective values 1731 and 1732 for DIFF 1710 are 19, and −2, respectively. Hence, if, for example, the true angle of arrival was 80 degrees, then the two DIFF values, 1720 and 1731 are −6 and 19 dB respectively and there is just one solution, 80 degrees.

FIG. 18 is a diagrammatical depiction, 1800, of the error distances resulting from the DIFF values shown in FIG. 17. The horizontal axis 1801 is the angle of arrival, AoA, and the vertical axis 1802 is γ. The value V is calculated for every AoA 30 to 150 degrees in 1 degree steps, for λ=30 to 150 and the result displayed as a shade of grey. Black represents V=0 and then the shade becomes progressively lighter as V increases. The shade key 1830 is shown. The black diagonal 1810 is for γ=AoA. In this example there are no results outside of the diagonal 1810 where V=0.

The diagrammatical depictions as represented in FIGS. 16 and 18 can be used in order to see the resulting accuracies of varying the dimensions D and h. It is clear that there are many possible variations for the values of D and h and this type of diagrammatical depiction can be used in order to compare the results. By examination of FIGS. 16 and 18, for example, it can be seen that increasing dimension D introduces possible duplicate readings, but improves the accuracy of the readings. Variations of the tilt angle(s) will also affect the accuracy and number of duplicate results.

FIGS. 16 and 18 are constructed based upon the theoretical values for DIFF using formulas (8), (9), (10), (11), (12), (13), and (14). Using these formulas plus the RSSI of the incident signal, (which may reduce the peak values as shown in FIGS. 9 and 10), either the AoA values may be calculated directly from the respective DIFF values or may be obtained from look-up tables. The look-up tables may be constructed by calibration.

FIGS. 19A, 19B, 19C, and 19D represent exemplary implementations of antenna arrays of the disclosure.

Figure 19A:
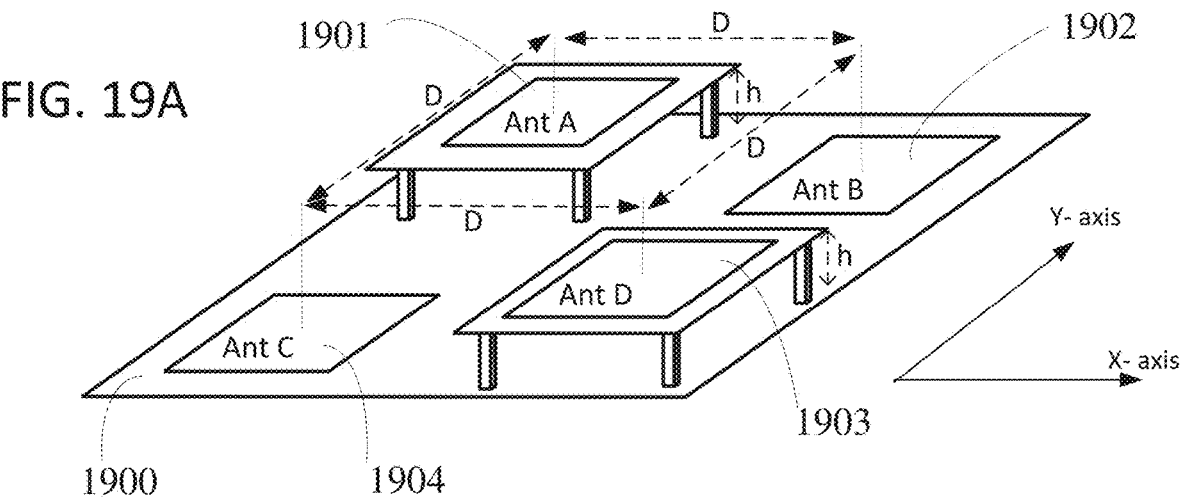
FIGS. 19A, 19B, 19C, and 19D represent exemplary implementations of the antenna arrays of the disclosure.

In FIG. 19A an antenna array 1900 is shown in which antenna A 1901 and antenna B 1902 form a two element antenna array in the X-axis where antenna A 1901 is at a height h above antenna B 1902 and the separation between antenna A 1901 and antenna B 1902 is D. Antenna C 1903 and antenna D 1904 form another two element antenna array in the X-axis where antenna D 1904 is at a height h above antenna C 1903 and the separation between antenna C 1903 and antenna D 1904 is D. Hence, the two antenna arrays in the X-axis are positioned such that their tilt angles are equal and opposite, as depicted in FIGS. 15 and 17. Antenna A 1901 and antenna C 1904 form a two element antenna array in the Y-axis where antenna A 1904 is at a height h above antenna C 1903 and the separation between antenna A 1901 and antenna C 1903 is D. Antenna B 1902 and antenna D 1904 form a second two element antenna array in the Y-axis where antenna D 1904 is at a height h above antenna B 1902 and the separation between antenna B 1902 and antenna D 1904 is D. Hence, the two antenna arrays in the Y-axis are also positioned such that their tilt angles are equal and opposite. The four antennas A 1901, B 1902, C 1903, and D 1904 therefore form two pairs of tilted antenna arrays, one pair in the X-axis and one pair in the Y-axis, thereby forming antenna array 1900. As previously described, each pair of tilted antenna arrays can produce a set of DIFF values that provide an angle of arrival measurement. Therefore, the complete four antenna array, depicted in FIG. 19A can be used to measure AoA in both the X and Y axes. In embodiments where this complete antenna array is mounted in an airborne platform, therefore, accurate measurements of the angles of arrival in both the horizontal and vertical planes result.

In FIG. 19A the separation between antennas A 1901 and B 1902, and antennas C 1903 and D 1904 is the same, D, and also the height h of antenna A 1901 above antenna B 1902 is the same as the height h of antenna D 1904 above antenna C 1903. Although it is possible to have many separations and heights between the antenna pairs, keeping the complete four antenna array somewhat symmetrical keeps the calculations for the horizontal and vertical angles of arrival simpler. Other symmetrical arrays are shown in FIGS. 19B, 19C, and 19D.

Figure 19B:
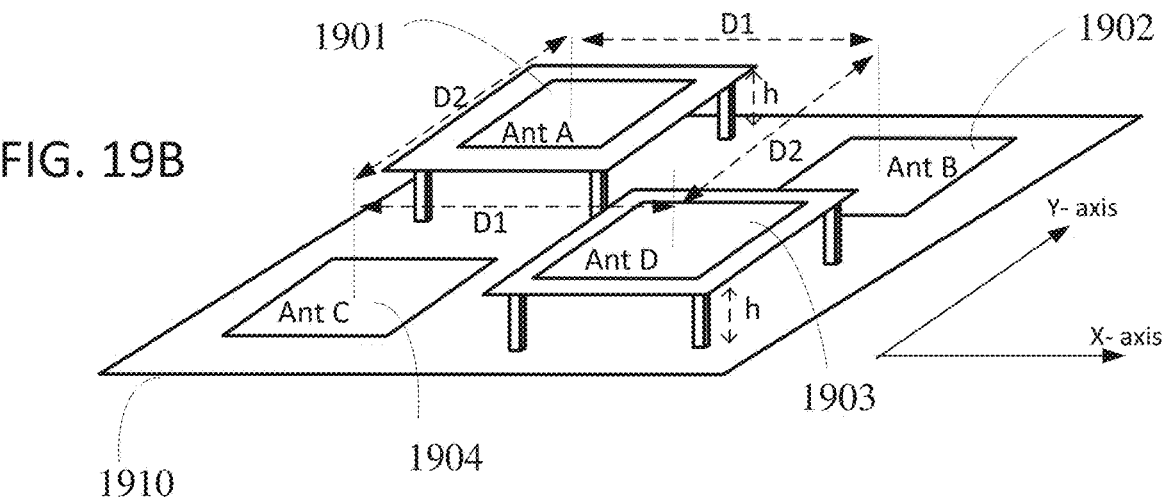

FIG. 19B shows antenna array 1910. Antenna array 1910 is similar to antenna array 1900 of FIG. 19A but antenna array 1910 has a separation between antennas A 1901 and B 1902, and antennas C 1903 and D 1904 of D1, and a separation between antennas A 1901 and C 1903, and antennas B 1902 and D 1904 of D2.

Figure 19C:
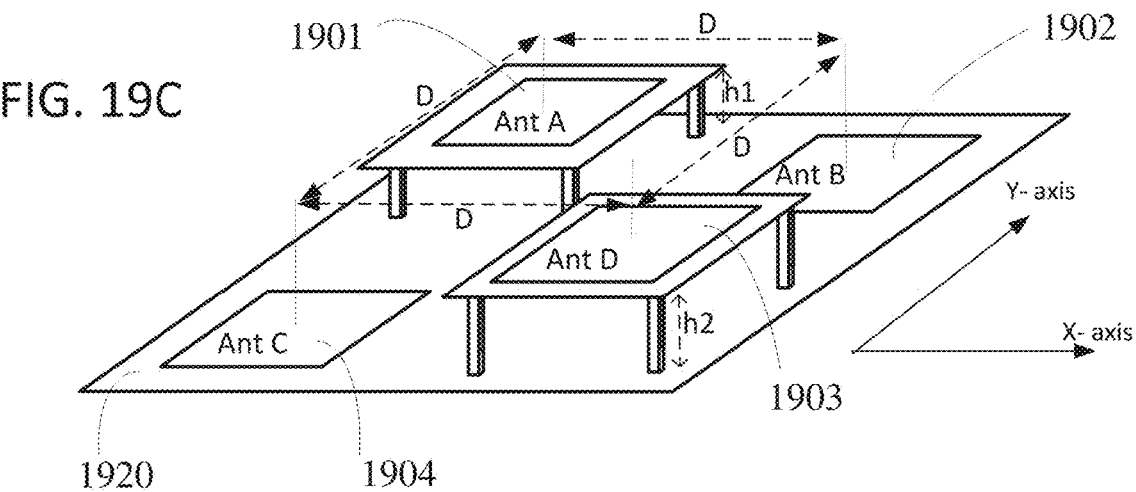

FIG. 19C shows antenna array 1920. Antenna array 1920 is similar to antenna array 1900 of FIG. 19A but antenna array 1920 has a height of antenna A 1901 above antenna B 1902 of h1, and a height of antenna D 1904 above antenna C 1903 of h2.

Figure 19D:
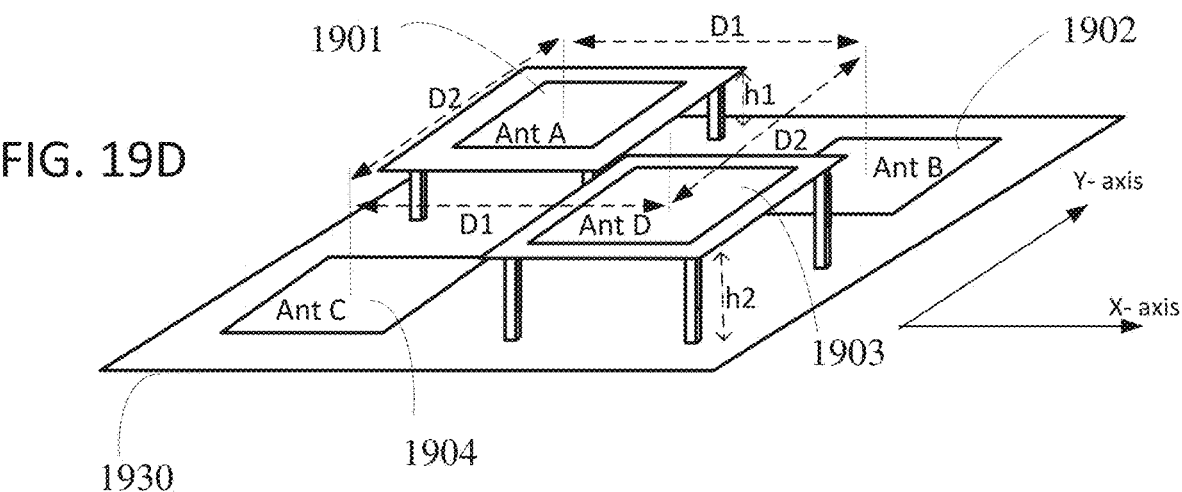

FIG. 19D shows antenna array 1930. Antenna array 1930 is similar to antenna array 1910 of FIG. 19B but antenna array 1930 has a height of antenna A 1901 above antenna B 1902 of h1, and a height of antenna D 1904 above antenna C 1903 of h2.

FIG. 20 is a diagrammatic representation of an embodiment of an example system comprising four patch antennas, antenna A 1901, antenna B 1902, antenna C 1903, and antenna D 1904. Similar to that described in FIG. 7, the signals from antenna A 1901 and antenna B 1902 are each applied to the input of a 2-way 90 degree splitter 2001 and 2002, respectively. The +90 degree output from splitter 2001 is connected to one input of a 2-way 0 degree combiner 2011. Similarly, the +90 degree output from splitter 2002 is connected to one input of a 2-way 0 degree combiner 2012. The 0 degree output from splitter 2001 is connected to the other input of combiner 2012 whereas the 0 degree output from splitter 2002 is connected to the other input of combiner 2011. Hence, the signal E at the output of splitter 2011 is the sum of the signal from antenna A 1901 shifted by +90 degrees, and the signal from antenna B 1902 shifted by 0 degrees. Similarly, the signal F at the output of splitter 2012 is the sum of the signal from antenna A 1901 shifted by 0 degrees, and the signal from antenna B 1902 shifted by +90 degrees.

The signals from antenna C 1903 and antenna D 1904 are each applied to the input of a 2-way 90 degree splitter, 2003 and 2004 respectively. The +90 degree output from splitter 2003 is connected to one input of a 2-way 0 degree combiner 2013. Similarly, the +90 degree output from splitter 2004 is connected to one input of a 2-way 0 degree combiner 2014. The 0 degree output from splitter 2003 is connected to the other input of combiner 2014 whereas the 0 degree output from splitter 2004 is connected to the other input of combiner 2013. Hence the signal G at the output of splitter 2013 is the sum of the signal from antenna C 1903 shifted by +90 degrees, and the signal from antenna D 1904 shifted by 0 degrees. Similarly, the signal H at the output of splitter 2014 is the sum of the signal from antenna C 1903 shifted by 0 degrees, and the signal from antenna D 1904 shifted by +90 degrees.

The +90 degree output from splitter 2001 is also connected to one input of a 2-way 0 degree combiner 2021. Similarly, the +90 degree output from splitter 2003 is connected to one input of a 2-way 0 degree combiner 2022. The 0 degree output from splitter 2001 is connected to the other input of combiner 2022 whereas the 0 degree output from splitter 2003 is connected to the other input of combiner 2021. Hence, the signal J at the output of splitter 2021 is the sum of the signal from antenna A 1901 shifted by +90 degrees, and the signal from antenna C 1903 shifted by 0 degrees. Similarly, the signal K at the output of splitter 2022 is the sum of the signal from antenna A 1901 shifted by 0 degrees, and the signal from antenna C 1903 shifted by +90 degrees.

The +90 degree output from splitter 2002 is also connected to one input of a 2-way 0 degree combiner 2023. Similarly, the +90 degree output from splitter 2004 is connected to one input of a 2-way 0 degree combiner 2024. The 0 degree output from splitter 2002 is connected to the other input of combiner 2024 whereas the 0 degree output from splitter 2004 is connected to the other input of combiner 2023. Hence the signal L at the output of splitter 2023 is the sum of the signal from antenna B 1902 shifted by +90 degrees, and the signal from antenna D 1904 shifted by 0 degrees. Similarly, the signal M at the output of splitter 2024 is the sum of the signal from antenna B 1902 shifted by 0 degrees, and the signal from antenna D 1904 shifted by +90 degrees.

Note that in the description above the 0 degree and +90 degree outputs from each 2-way 90 degree splitter 2001, 2002, 2003, and 2004 are split so as to provide inputs to two combiners. Hence, a 2-way splitter is required at each output of the 2-way 90 degree splitters 2001, 2002, 2003, and 2004. These are not shown in FIG. 20.

Some embodiments include two identical radio receiver systems 2030 and 2040. Receiver system 2030 may include four radio receiver front ends, RX A 2031, RX B 2032, RX C 2033, and RX D 2034, an interface 2035, and processing circuitry 2038 including a processor 2036 and memory 2037. Similarly, receiver system 2040 may include four radio receiver front ends, RX A 2041, RX B 2042, RX C 2043, and RX D 2044, an interface 2045, and processing circuitry 2048 including a processor 2046 and memory 2047.

Although embodiments are described herein as including two identical radio receiver systems, e.g., radio receiver systems 2030 and 2040, implementations are not limited to such. It is contemplated that embodiments can be implemented using a single radio receiver system. For example, a single radio receiver system similar to radio receiver system 2030 can be provisioned with front end receivers to support the horizonal AoA and vertical AoA signals, e.g., signals E-H and J-M. In the case of the example shown in FIG. 20, this single radio receiver system would include eight front end receivers, e.g., receivers 2031-2034 and 2041-2044 would be implemented in the signal radio receiver system. In another embodiment, the single radio receiver system can maintain the original quantity of front end receivers discussed above for the dual radio receiver system, e.g., four, but implement a multiplexor to multiplex the horizontal AoA and vertical AoA signals.

Signals E, F, G and H are respectively inputted to RX A 2031, RX B 2032, RX C 2033, and RX D 2034 of receiver system 2038. The RSSI for each of the signals E, F, G, and H are measured by RX A 2031, RX B 2032, RX C 2033, and RX D 2034 respectively and outputted to the interface 2035. The interface 2035 and processing circuitry 2038 may be used to subtract the RSSI values of the signals E and F, and also to subtract the RSSI values of the signals G and H so as to produce the respective values for DIFF as described previously. The processing circuitry 2038, e.g., processor 2036 and memory 2037, may also be used to calculate the effective input signal at the antenna pairs. This calculation may be accomplished, for example, by converting the two RSSI values to milliwatts, adding them and then converting the value back to dBm. As described above with respect to FIG. 9 and FIG. 10, the peak values 920, 921, 1020, and 1021 are affected by the antenna input signal level. Hence, a knowledge of the signal level may be used to estimate the peak values and the effective flattening. An alternative is that either receiver system 2038 may include a fifth receiver chain, or a separate receiver is provided and the output signal from any of the antennas A, B C or D is inputted to this receiver. This however may involve extra RF splitters to be used which may affect the overall sensitivity of the receive chain.

The conversion of the DIFF value to angles of arrival may be carried out in the processing circuitry 2038 or in a computer/display 2050. Similarly, it is contemplated that the computer/display 2050 can include a processing circuitry such as a processor and a memory in which the memory stores instructions that, when executed by the processor, cause the processor to perform functions described herein to determine the angles of arrival. The display may be any display device suitable for presenting a user with the angle of arrival and other information.

Signals E, F, G, and H are used to determine the horizontal angle of arrival. The conversion may be accomplished by direct application of the formulas (8) to (14) or via look-up tables based upon these same formulas. In order to cater for practical installations, the look-up tables may also be constructed by calibration.

Signals J, K, L and M are respectively inputted to RX A 2041, RX B 2042, RX C 2043, and RX D 2044 of receiver system 2048. The RSSI for each of the signals J, K, L and M are measured by RX A 2041, RX B 2042, RX C 2043, and RX D 2044 respectively and outputted to the interface 2045. The interface 2045 and processing circuitry 2048 may be used to subtract the RSSI values of the signals J and K, and also to subtract the RSSI values of the signals L and M so as to produce the respective values for DIFF as described previously. The processing circuitry 2048, e.g., processor 2046 and memory 2047 may also be used to calculate the effective input signal at the antenna pairs. The conversion of the DIFF value to angles of arrival may be carried out in the processing circuitry 2048 or in a computer/display block 2050. Signals J, K, L, and M are used to determine the vertical angle of arrival. The conversion may be accomplished by direct application of the formulas (8) to (14) or via look-up tables based upon these same formulas. In order to cater for practical installations, the look-up tables may also be constructed by calibration.

In one embodiment, the receivers 2030 and 2040 include a processing circuitry such as the processor 2036 and 2046 and memory 2037 and 2047 in which the memories 2037 and 2047 store instructions that, when executed by the processor 2036 and 2046 respectively, cause the processor 2036 or 2046 to perform functions described herein to determine the angles of arrival.

In addition to a traditional processor and memory, the processing circuitry of receivers 2030 and 2040 (and computer/display 2050) may include integrated circuitry for processing and/or control, e.g., one or more processors and/or processor cores and/or FPGAs (Field Programmable Gate Array) and/or ASICs (Application Specific Integrated Circuitry). The processor may be configured to access (e.g., write to and/or reading from) memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory may be configured to store code executable by processor and/or other data, e.g., data pertaining to communication, e.g., configuration and/or address data of nodes, etc.

The processing circuitry of the receivers 2030 and 2040 (and computer/display 2050) may be configured to control any of the methods and/or processes described herein and/or to cause such methods and/or processes to be performed. Corresponding instructions may be stored in the memory 2037 or 2047, which may be readable and/or readably connected to processor 2036 or 2046 respectively.

The inclusion of the splitters 2021, 2022, 2023 and 2024 and the receiver system 2040, plus the relative connections, enables the four antenna array to be used to provide AoAs in two planes. If AoAs in just one plane are required then the splitters 2021, 2022, 2023 and 2024 and the receiver system 2040, plus the relative connections may be omitted. The following descriptions assume that the AoAs in two planes are required.

Figure 21:
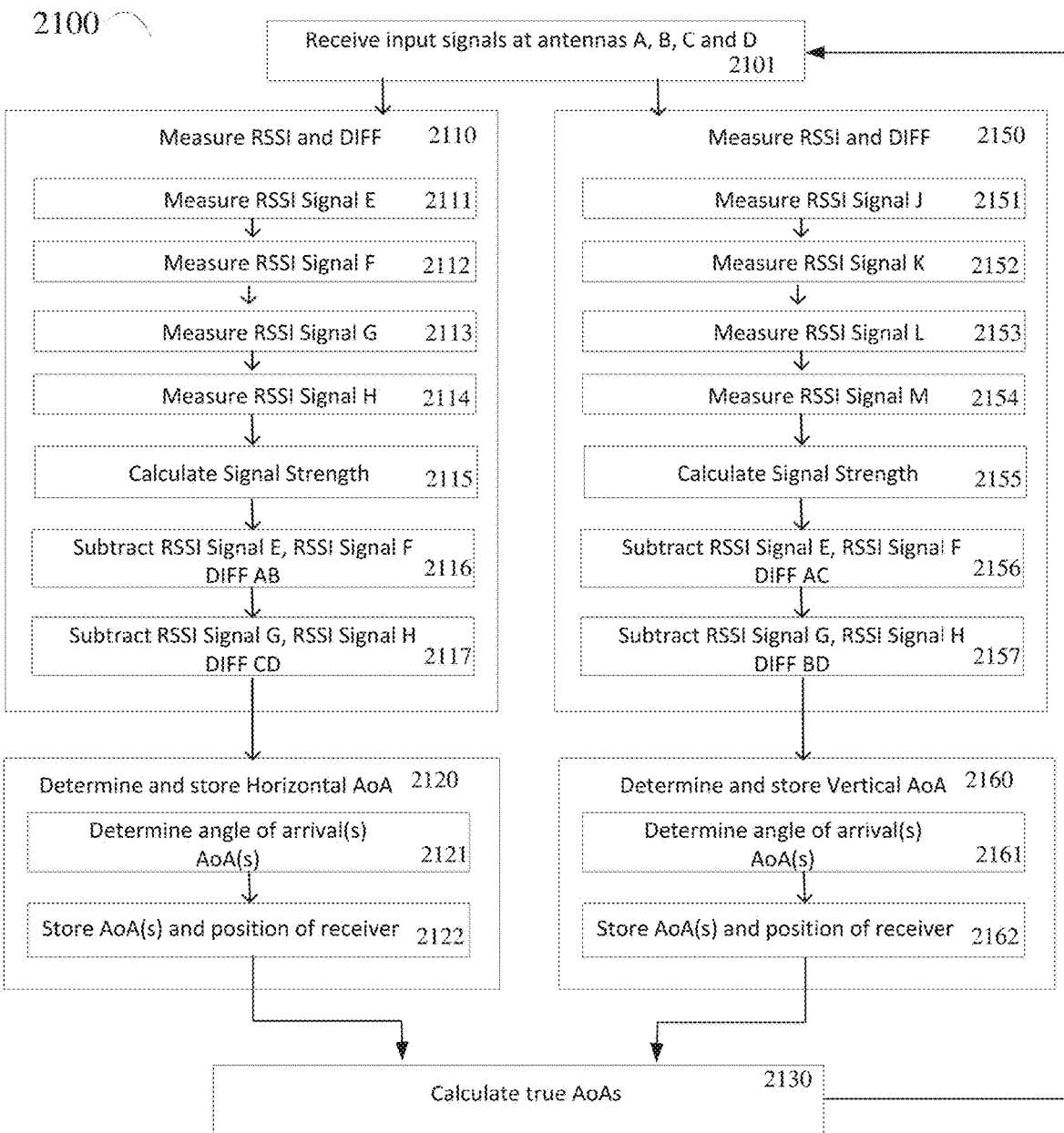
FIG. 21 illustrates an example method for determining an angle of arrival according to an embodiment of the disclosure.

FIG. 21 illustrates an example method 2100 for determining an angle of arrival according to an embodiment of the disclosure. Method 2100 may include two identical blocks 2110 and 2150 where the RSSI and DIFF values are measured for signals E, F G, H and J, K, L, M respectively via receivers 2031, 2032, 2033, 2034 and 2041, 2042, 2043 2044, respectively, and the differences between them, DIFF AB/DIFF CD and DIFF AC/DIFF BD, calculated, via the processing circuitry 2038 and 2048.

Block 2110 may start with blocks 2111, 2112, 2113 and 2114 where the RSSI values of signals E, F G, and H at the inputs of RX A 2031, RX B 2032, RX C 2033, and RX D 2034 respectively are measured. Block 2114 may be followed by block 2115 where the RSSI of the signal at the output of either antenna A 1901, B 1902, C 1903 or D 1904 is calculated by combining the two RSSI values for signals E and F and/or signals G and H via the interface 2035. Block 2115 may be followed by block 2116 where the value for DIFF AB is calculated, via the processor circuit 2038, by subtraction of the two RSSI values for signals E and F. Block 2116 may be followed by block 2117 where the value for DIFF CD is calculated, via the processor circuit 2038, by subtraction of the two RSSI values for signals G and H. As previously described the RSSI values will generally be in dBm and a simple subtraction is the equivalent of the direct ratio of the signals. The DIFF value will be in dB and will be generally independent of the signal strengths of the input signal and output signals to and from the antennas as previously described in FIG. 9 and FIG. 10.

Block 2117 may be followed by block 2120 where the horizontal AoA values are calculated. Block 2120 may start with block 2121 where the DIFF values calculated in blocks 2116 and 2117 are used, via the processor circuitry 2038, to determine the possible horizontal angles of arrival of the signal at the antennas, possibly via direct calculation or using look-up table(s). In order to support practical installations, the look-up tables may also be constructed by calibration. Block 2121 may be followed by block 2122 where the results of block 2121 may be stored together with the location of the antennas and receiving system.

Block 2150 may start with blocks 2151, 2152, 2153 and 2154 where the RSSI values of signals J, K, L, and M at the inputs of RX A 2041, RX B 2042, RX C 2043, and RX D 2044 respectively are measured. Block 2154 may be followed by block 2155 where the RSSI of the signal at the output of either antenna A 1901, B 1902, C 1903 or D 1904 is calculated by combining the two RSSI values for signals J and K and/or L and M via the interface 2045. Block 2155 may be followed by block 2156 where the value for DIFF CD is calculated, via the processor circuit 2048, by subtraction of the two RSSI values for signals J and K. Block 2116 may be followed by block 2157 where the value for DIFF BD is calculated, via the processor circuit 2048, by subtraction of the two RSSI values for signals L and M.

Block 2157 may be followed by block 2160 where the vertical AoA values are calculated. Block 2160 may start with block 2161 where the DIFF values calculated in blocks 2166 and 2167 are used, via the processor circuitry 2048, to determine the possible vertical angles of arrival of the signal at the antennas, possibly via direct calculation or using look-up table(s). In order to cater for practical installations, the look-up tables may also be constructed by calibration. Block 2161 may be followed by block 2162 where the results of block 2161 may be stored together with the location of the antennas and receiving system.

Blocks 2122 and 2162 may be followed by block 2120 where the true horizontal and vertical angles of arrival may be determined via the processor 2050. As previously described with respect to FIGS. 15 to 18, it is possible that more than one possible AoA results from the determinations in blocks 2121 and 2161. Several techniques may be used to determine the true AoAs. These may include simple jittering of the results. By reference to FIG. 17, for example, with this topology of the antennas, AoAs of 60 and 120 degrees produce the same results. Note, however, that they are 60 degrees in separation. The results will however, inevitably have jitter and as such, the actual AOA, 60 or 120 degrees would soon become apparent. For example, assuming the correct AoA is 60 degrees, a negative jitter will produce a difference value between DIFF 1700 and DIFF 1710 that is positive compared to that at 60 degrees, whereas at the 120 degree solution, the difference value will be negative to that at 120 degrees. Also, if the receiving system is airborne and moving, for example, this anomaly will be automatically cancelled as soon the angle changes. Block 2130 can use techniques such as these to establish the true horizontal and vertical AoAs. As noted previously, however, as described with reference to FIG. 17 and FIG. 18, by reducing the separation between the antennas, the anomalies may be eliminated or significantly reduced.

Described above is a detailed explanation of embodiments using four antennas. It will be appreciated to a person of ordinary skill in the art that different combinations of antenna spacing, tilt angles, antenna combining and combinations may be used. Thus, the disclosure and implementations are not limited to four antennas.

While the above description contains many specifics, these should not be construed as limitations on the scope, but rather as an exemplification of several embodiments thereof. Many other variants are possible including, for examples: various phasing and combining schemes, use of different antennas, use of more than two antennas per array, the use of a variety of antenna directivity, use of different measuring RF receiver schemes—number of receive chains, integral or separate processor(s), integral or separate computer and display(s), the use of various separations of the antennas, the use of various tilt angles. Accordingly, the scope should be determined not by the embodiments illustrated.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for determining an angle of arrival of a beam received at an antenna array, the antenna array having at least two antenna elements, the method comprising:
  receiving a first signal at an antenna element A, and receiving a second signal at an antenna element B;
  producing, via a first network, a first output signal E based on a first combination of the first and second signals and producing, via the first network, a second output signal F based on a second combination of the first and second signals;
  determining a difference of first output signal E and second output signal F to produce a first difference signal (DIFF AB);
  receiving a third signal at an antenna element C, and receiving a fourth signal at an antenna element D;
  producing, via a second network, a third output signal G based on a first combination of the third and fourth signals and producing, via the second network, a fourth output signal H based on a second combination of the third and fourth signals;
  determining a difference of third output signal G and fourth output signal H to produce a second difference signal (DIFF CD); and
  determining a first directional angle of arrival of the beam from a first set of candidate angles of arrival based at least in part on the first difference signal (DIFF AB) and the second difference signal (DIFF CD).

2. The method of claim 1, further comprising:
  producing, via a third network, a fifth output signal J based on a first combination of the first and third signals and producing, via the third network, a sixth output signal K based on a second combination of the first and the third signals;

determining a difference of fifth output signal J and sixth output signal K to produce a third difference signal (DIFF AC);

producing, via a fourth network, a seventh output signal L based on a first combination of the second and fourth signals and producing, via the fourth network, an eighth output signal M based on a second combination of the second and fourth signals;

determining a difference of seventh output signal L and eighth output signal M to produce a second difference signal (DIFF BD); and determining a second directional angle of arrival of the beam from a second set of candidate angles of arrival based at least in part on the first difference signal (DIFF AC) and the second difference signal (DIFF BD).

3. The method of claim 2, wherein antenna elements A and B are at different distances from a reference plane and antenna elements C and D are at different distances from the reference plane.

4. The method of claim 2, wherein a separation of the antennas elements A and B is a first distance and a separation of the antenna elements C and D is a second distance different from the first distance.

5. The method of claim 2, wherein the antenna elements C and D are at an obtuse angle with respect to the antenna elements A and B.

6. The method of claim 2, wherein the first directional angle of arrival is a horizontal angle of arrival and the second directional angle of arrival is a vertical angle of arrival.

7. The method of claim 1, wherein the first network includes two 90 degree splitters and two zero degree combiners, each zero degree combiner configured to receive inputs from both 90 degree splitters.

8. The method of claim 1, wherein a candidate angle of arrival is determined based on one of formulas and values in a look up table.

9. A receiver for determining an angle of arrival of a beam received at an antenna array of the receiver, the antenna array having at least two antenna elements, the receiver comprising:

an antenna element A configured to receive a first signal, an antenna element B configured to receive a second signal, an antenna element C configured to receive a third signal and an antenna element D configured to receive a fourth signal;

a first network configured to produce a first output signal E based on a first combination of the first and second signals and configured to produce a second output signal F based on a second combination of the first and second signals;

a second network configured to produce a third output signal G based on a first combination of the third and fourth signals and configured to produce a fourth output signal H based on a second combination of the third and fourth signals; and a processor configured to:
determine a difference of the first output signal E and the second output signal F to produce a first difference signal (DIFF AB);
determine a difference of the third output signal G and the fourth output signal H to produce a second difference signal (DIFF CD); and
determine a first directional angle of arrival of the beam from a first set of candidate angles of arrival based at least in part on the first difference signal (DIFF AB) and the second difference signal (DIFF CD).

10. The receiver of claim 9, further comprising:
a third network configured to produce a fifth output signal J based on a first combination of the first and third signals and configured to produce a sixth output signal K based on a second combination of the first and third signals;
a fourth network configured to produce a seventh output signal L based on a first combination of the second and fourth signals and configured to produce an eighth output signal M based on a second combination of the second and fourth signals; and
wherein the processor is further configured to:
determine a difference of fifth output signal J and sixth output signal K to produce a third difference signal (DIFF AC);
determine a difference of seventh output signal L and eighth output signal M to produce a second difference signal (DIFF BD); and
determine a second directional angle of arrival of the beam from a second set of candidate angles of arrival based at least in part on the first difference signal (DIFF AC) and the second difference signal (DIFF BD).

11. The receiver of claim 10, wherein the antenna elements A and B are at different distances from a reference plane and the antenna elements C and D are at different distances from the reference plane.

12. The receiver of claim 10, wherein a separation of the antennas elements A and B is a first distance and a separation of the antenna elements C and D is a second distance different from the first distance.

13. The receiver of claim 10, wherein the antenna elements A and B are at an obtuse angle with respect to the antenna elements C and D.

14. The receiver of claim 10, wherein the first directional angle of arrival is a horizontal angle of arrival and the second directional angle of arrival is a vertical angle of arrival.

15. The receiver of claim 9, wherein the first network includes two 90 degree splitters and two zero degree combiners, each zero degree combiner configured to receive inputs from both 90 degree splitters.

16. The receiver of claim 9, wherein a candidate angle of arrival is determined based on one of formulas and values in a look up table.

17. A method in a receiver configured to determine an angle of arrival of a beam, the method comprising:
receiving a first signal at an antenna element A, receiving a second signal at an antenna element B, receiving a third signal at an antenna element C, and receiving a fourth signal at an antenna element D;
producing, via a first network, a first output signal E based on a first combination of the first and second signals and producing, via the first network, a second output signal F based on a second combination of the first and second signals, the first network having first and second 90 degree splitters and first and second combiners, the first and second splitters and first and second combiners configured to receive the first and second signals at input ports of the first and second splitters, respectively, and to produce the first output signal E and the second output signal F at different output ports of the first and second combiners;
producing, via a second network, a third output signal G based on a first combination of the third and fourth signals and producing, via the second network, a fourth output signal H based on a second combination of the third and fourth signals, the second network having third and fourth 90 degree splitters and third and fourth combiners, the third and fourth splitters and third and fourth combiners configured to receive the third and fourth signals at input ports of the third and fourth splitters, respectively, and to produce the third output signal G and the fourth output signal H at different output ports of the third and fourth combiners;

determining a difference of first output signal E and second output signal F to produce a first difference signal (DIFF AB);

determining a difference of third output signal G and fourth output signal H to produce a second difference signal (DIFF CD); and determining a first directional angle of arrival of the beam from a set of candidate angles of arrival based at least in part on the first difference signal (DIFF AB) and the second difference signal (DIFF CD).

18. The method of claim 17, wherein the antenna elements A, B, C and D are patch antenna elements positioned at different distances away from a ground plane.

19. The method of claim 18, further comprising determining the first difference signal DIFF AB by computing a ratio of the first output signal E to the second output signal F.

20. The method of claim 19, further comprising determining the second difference signal DIFF CD by computing a ratio of the third output signal G to the fourth output signal H.

* * * * *